US006741354B2

United States Patent
Numai

(10) Patent No.: US 6,741,354 B2
(45) Date of Patent: *May 25, 2004

(54) LASER DEVICE HAVING AN OPTICAL WAVEGUIDE FOR DISCERNING MOVEMENT OF AN OPTICAL GYROSCOPE AND AN OPTICAL GYROSCOPE UTILIZING SAME

(75) Inventor: Takahiro Numai, Ninomiya-machi (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/484,183

(22) Filed: Jan. 18, 2000

(65) Prior Publication Data

US 2002/0176087 A1 Nov. 28, 2002

(30) Foreign Application Priority Data

Jan. 18, 1999 (JP) .......................... 11-009812
Jan. 19, 1999 (JP) .......................... 11-011100
Feb. 12, 1999 (JP) .......................... 11-034826
Apr. 15, 1999 (JP) .......................... 11-108338
Jan. 12, 2000 (JP) .......................... 2000-003895

(51) Int. Cl.$^7$ ............................................ G01C 19/66
(52) U.S. Cl. ................................................... 356/461
(58) Field of Search ........................... 356/459, 460, 356/472, 461; 372/94

(56) References Cited

U.S. PATENT DOCUMENTS 3,373,650 A * 3/1968 Killpatrick .................. 356/472
3,467,472 A * 9/1969 Killpatrick .................. 356/472
3,879,130 A   4/1975 Greenstein
4,120,587 A   10/1978 Vali et al.
4,229,106 A   10/1980 Dorschner et al.
4,429,997 A   2/1984 Matthews
4,431,308 A   2/1984 Mitsuhashi et al. ......... 356/459
4,521,110 A   6/1985 Roberts et al.
4,718,766 A   1/1988 Greenstein
4,913,548 A   4/1990 Vick
5,037,203 A * 8/1991 Yeh ............................. 356/459
5,764,681 A   6/1998 Ballantyne et al. ........... 372/94
6,219,366 B1 * 4/2001 Furushima .................... 372/50

FOREIGN PATENT DOCUMENTS

| GB | 2 017 392 | 10/1979 |
|---|---|---|
| JP | 57-043486 | 3/1982 |
| JP | 59-41883 | 3/1984 |
| JP | 60-148185 | 8/1985 |
| JP | 3-145179 | 6/1991 |
| JP | 04-174317 | 6/1992 |
| JP | 05-288556 | 11/1993 |
| JP | 06-038529 | 2/1994 |
| JP | 6-140364 | 5/1994 |
| JP | 7-131123 | 5/1995 |
| JP | 7-139954 | 6/1995 |
| JP | 7-146150 | 6/1995 |
| JP | 8-18166 | 1/1996 |
| JP | 8-125251 | 5/1996 |

* cited by examiner

Primary Examiner—Samuel A. Turner
(74) Attorney, Agent, or Firm—Fitzpatrick, Cella, Harper & Scinto

(57) ABSTRACT

A gyro comprising a laser device for generating laser beams to be propagated circuitally in opposite directions, wherein an electric signal is taken out from the laser device, the oscillation frequencies of the laser beams being different from each other when the laser device is held stationary.

56 Claims, 23 Drawing Sheets

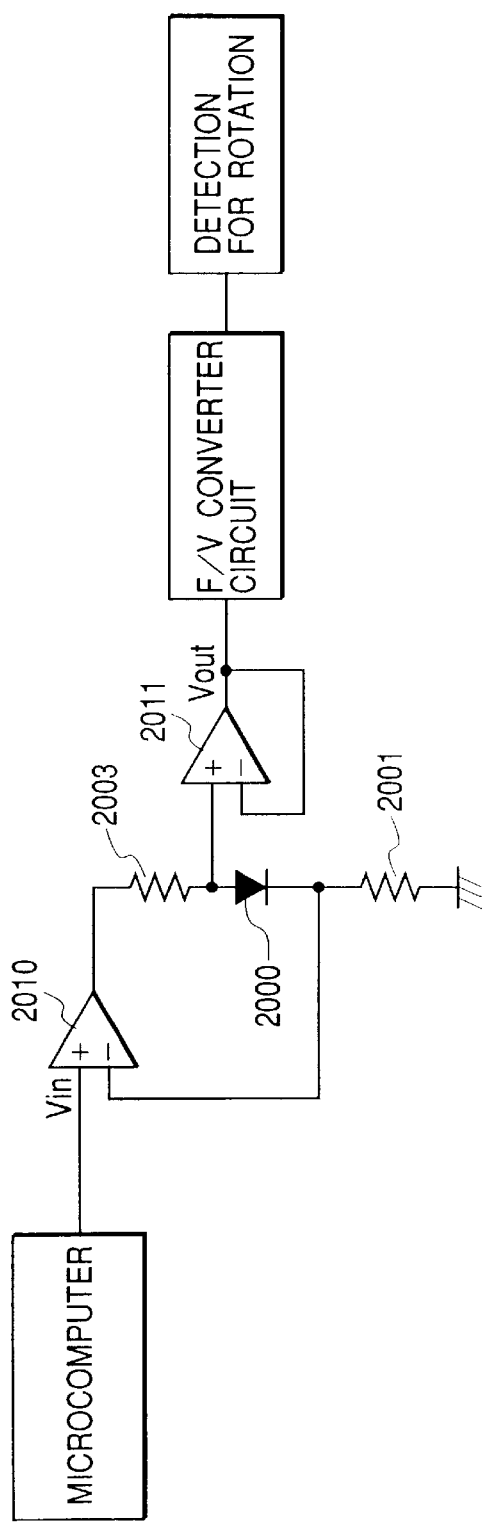
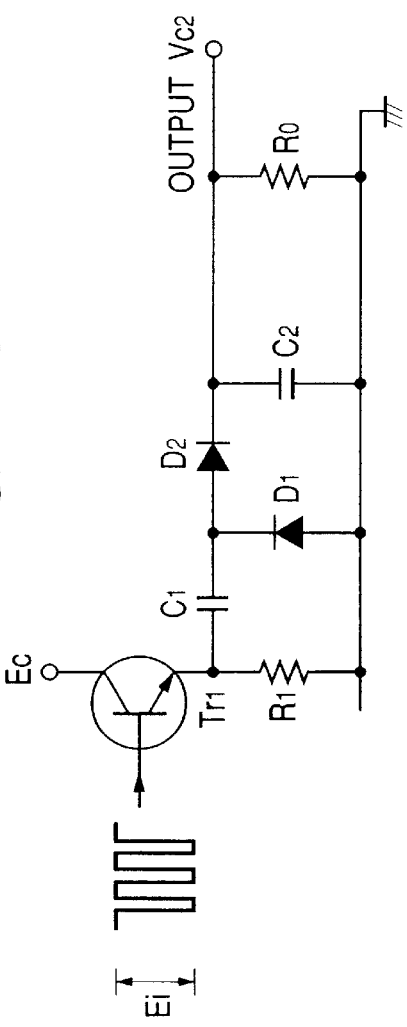

LASER DEVICE HAVING AN OPTICAL WAVEGUIDE FOR DISCERNING MOVEMENT OF AN OPTICAL GYROSCOPE AND AN OPTICAL GYROSCOPE UTILIZING SAME

BACKGROUND OF THE INVENTION

1. Field of the Invention

This invention relates to a laser apparatus. The present invention also relates to a gyro apparatus and, more particularly, it relates to a gyro utilizing a semiconductor laser.

2. Related Background Art

Known gyros for detecting the angular velocity of a moving object include mechanical gyros comprising a rotor or an oscillator as well as optical gyros. Particularly, optical gyros are bringing forth technological innovations in the field of gyro technologies due to their remarkable advantages including that they can start to operate instantaneously and show a broad dynamic range. Various optical gyros are known to date including ring laser type gyros, optical fiber gyros and passive type ring resonator gyros. Of these, the ring laser type gyro that utilizes a gas laser is the earliest comer and gyros of this type are popularly used in aeroplanes at present. In recent years, small and highly sophisticated semiconductor laser gyros that are formed on a semiconductor substrate have been proposed. See, inter alia, Japanese Patent Application Laid-Open No. 5-288556.

According to the above patent publication, a ring-shaped gain waveguide 5711 is formed on a semiconductor substrate 5710 having an pn-junction and carriers are implanted into the gain waveguide 5711 from an electrode 5722 as shown in FIG. 50 of the accompanying drawings in order to generate a laser oscillation. Then, the laser beams that are propagating through the gain waveguide 5711 clockwise and counterclockwise are partly taken out and caused to interfere with each other in photo-absorption region 5717. Then, the interfering beams are taken out through another electrode 5723 as a photoelectric current to see the intensity of interference. In FIG. 50, reference numeral 5712 denotes a reflection surface, reference numerals 5713 and 5714 denote optical output surfaces and reference numerals 5718 and 5719 denote optical outputs.

Japanese Patent Application Laid-Open No. 57-43486 (U.S. Pat. No. 4,431,308) discloses a gyro which utilizes the change of the terminal voltage of a semiconductor laser device caused by rotation without taking out light to the outside of the device. Referring to FIG. 51, a semiconductor laser device 5792 comprises two electrodes 5790 and 5791 on the top and the bottom thereof, numeral 5793 denotes a condenser for blocking direct current, numeral 5794 denotes an output terminal, and numeral 5795 denotes a resistor. It is described that a semiconductor laser device serving as a laser device in a ring laser device is connected to a driving power source 5796 so that the frequency difference between the lights propagating clockwise and counterclockwise, which are generated when an angular velocity is given to the device, is detected in terms of the change of the terminal voltage of the laser device, as shown in FIG. 51.

Japanese Patent Application Laid-Open No. 4-174317 also teaches detecting the change of the terminal voltage of a laser device caused by rotation.

However, neither of the above publications could detect the rotation direction of an object. This is because beat frequencies become equal when angular velocities are equal, even if rotational directions are different.

However, since known ring laser type gyros such as the one as described above are not adapted to detect the sense of rotation itself and therefore the latter has to be determined by applying a dither (micro-oscillation) and determining the correlation of the dither and the obtained signal.

Additionally, in known ring laser type gyros, the oscillation frequencies are separated from each other as the gyro rotates. The difference of the oscillation frequencies is very small when the rate of revolution is low and then there arises a locking-in phenomenon where the oscillation frequencies are led to one of the modes of oscillation. This locking-in phenomenon observable in known ring laser type gyros can be avoided by applying a dither.

SUMMARY OF THE INVENTION

Thus, it is the object of the present invention to provide a gyro that can detect the sense of rotation without using a mechanical device such as a dither generator.

According to the invention, the above object is achieved by providing a gyro comprising:

a laser device for generating laser beams to be propagated circuitally in opposite directions, wherein an electric signal is taken out from said laser device;

the oscillation frequencies of the laser beams being different from each other when said laser device is held stationary.

According to the invention, there is also provided a gyro comprising:

a laser device having an optical waveguide including an asymmetrically tapered region arranged at least in part thereof, wherein an electric signal is taken out from said laser device.

Said waveguide of the laser device may be ring-shaped and said asymmetrically tapered region may be arranged outside or inside the ring-shape.

Said tapered region of the optical waveguide may include a first tapered section gradually broadening the optical waveguide along the direction of laser beam propagation and a second tapered section gradually narrowing the optical waveguide along the direction of laser beam propagation.

The angles defined respectively by said first and second tapered regions and the region of the optical waveguides showing a constant width may be acute.

According to the invention, there is also provided a gyro comprising:

a laser device for generating laser beams to be propagated circuitally in opposite directions; and an electric signal detection means for taking out an electric signal from said laser device;

the oscillation frequencies of the laser beams being different from each other when said laser device is held stationary.

Said electric signal detection means may comprise an electric terminal.

Said electric signal detection means may be a voltage signal detection means.

Said electric signal detection means may comprise a frequency-voltage conversion circuit.

Said electric signal detection means may comprise a subtraction circuit.

According to the invention, there is also provided a gyro comprising:

a laser device; and a beat signal detection means;

said laser device having an optical waveguide including an asymmetrical tapered region arranged at least in part thereof.

According to the invention, there is also provided a gyro comprising:

a laser device for generating first and second laser beams; and an optical detector for detecting the interfered light generated by interference of said first and second laser beams;

the oscillation frequencies of the first and second laser beams being different from each other when said laser device is held stationary.

According to the invention, there is also provided a laser device comprising:

an optical waveguide including an asymmetrically tapered region projecting to the outside;

said tapered region including a first tapered section gradually broadening the optical waveguide along the direction of laser beam propagation and a second tapered section gradually narrowing the optical waveguide along the direction of laser beam propagation;

the angles defined respectively by said first and second tapered regions and the region of the optical waveguides showing a constant width may be acute.

A gyro according to the invention may be arranged in a camera, a lens unit, an automobile, an aircraft or a ship.

BRIEF DESCRIPTION OF THE DRAWINGS

FIG. 10 is a schematic circuit diagram of another circuit adapted for taking out a beat signal.

FIG. 11 is a schematic circuit diagram of an F/V converter circuit.

DETAILED DESCRIPTION OF THE PREFERRED EMBODIMENTS

Before describing preferred embodiments of the invention, the principle underlying the operation of a gyro according to the invention will be described mainly by using FIG. 49 and equations.

Figure 49:
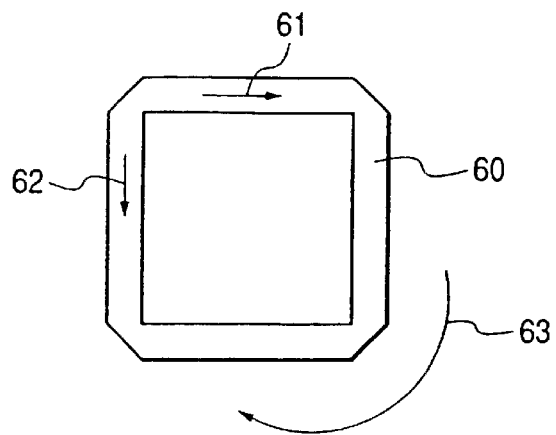
FIG. 49 is a schematic illustration of the principle of operation of a gyro according to the invention.
Figure 50:
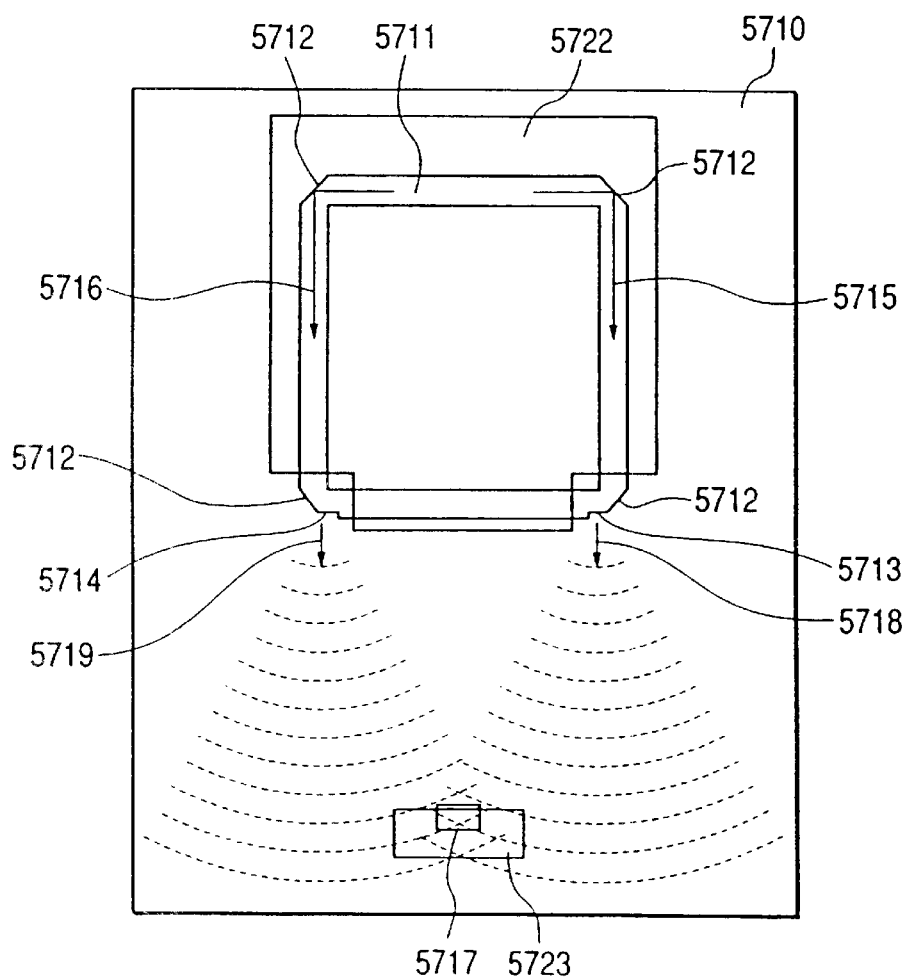
FIG. 50 is a schematic illustration of a known gyro.
Figure 51:
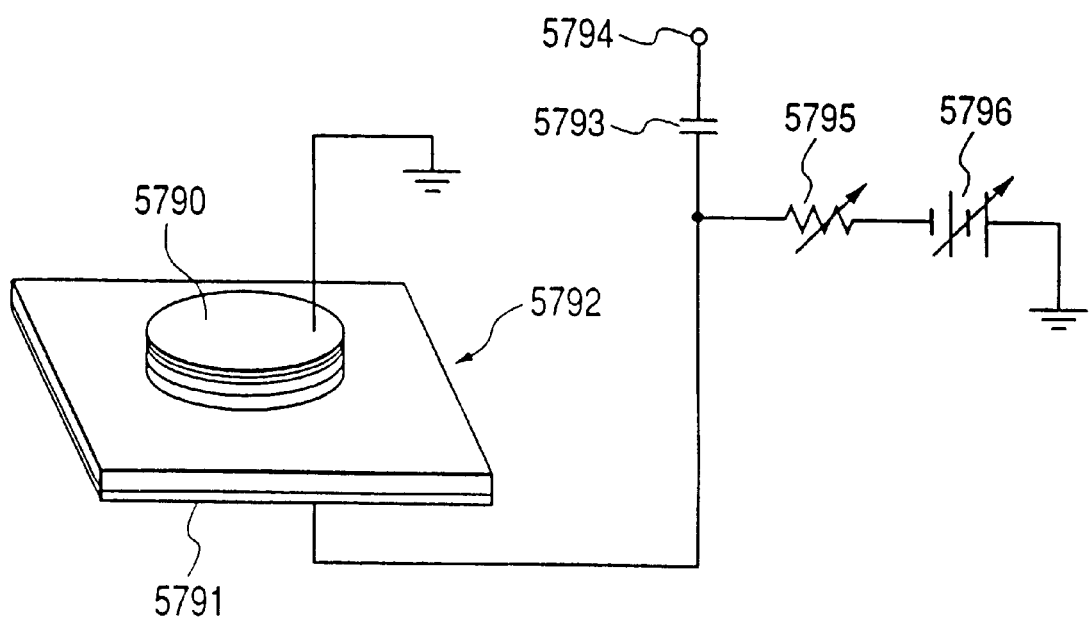
FIG. 51 is a schematic illustration of a known gyro.

Assume a laser device comprising an optical waveguide 60 as shown in FIG. 49. A laser oscillation occurs to generate a pair of laser beams when an electric current is made to flow therethrough with an intensity exceeding a threshold level and the one of the generated laser beams propagates clockwise (direction 61 in FIG. 49), whereas the other laser beam propagates counterclockwise (direction 62 in FIG. 49). Thus, the pair of laser beams propagate in opposite directions within the laser device.

So long as the laser device is held stationary, the frequency of the laser beam propagating clockwise is equal to that of the laser beam propagating counterclockwise.

However, once the laser device is driven to rotate in the sense as indicated by reference numeral 63 in FIG. 49 (clockwise), the two laser beams begin to show respective frequencies that are different from each other. This will be described below in greater detail.

If the frequency of the laser beam propagating clockwise is $\lambda_1$ and that of the laser beam propagating counterclockwise is $\lambda_2$ ($<\lambda_1$) and the laser is driven to rotate clockwise, the oscillation frequency $f_1$ of the first laser beam that is propagating clockwise is made smaller than the frequency $f_{10}$ of the first laser beam that is observed when the laser is not driven to rotate by a value expressed by equation (1) below;

$$\Delta f_1 = (2A_1/\lambda_1 L_1)\cdot\Omega \tag{1}$$

where $A_1$ is the closed area surrounded by the optical path of the first laser beam and $L_1$ is the length of the optical path of the first laser beam, whereas $\Omega$ is the angular velocity for the rotary motion of the laser. On the other hand, the oscillation frequency $f_2$ of the second laser beam that is propagating counterclockwise is made greater than the frequency $f_{20}$ of the second laser beam that is observed when the laser is not driven to rotate by a value expressed by equation (2) below;

$$\Delta f_2 = (2A_2/\lambda_2 L_2)\cdot\Omega \tag{2}$$

where $A_2$ is the closed area surrounded by the optical path of the second laser beam and $L_2$ is the length of the optical path of the second laser beam, whereas $\Omega$ is the angular velocity for the rotary motion of the laser. Since both the first laser beam and the second beam are found within the same laser, there arises a beat signal that can be expressed in terms of the difference of the oscillation frequency of the first laser beam and that of the second laser beam or equation (3) below;

$$f_2-f_1=f_{20}-f_{10}+(\Delta f_2+\Delta f_1)=f_{20}-f_{10}+[(2A_2/\lambda_2 L_2)\cdot\Omega+(2A_1/\lambda_1 L_1)\cdot\Omega] \tag{3}$$

If, on the other hand, the laser is driven to rotate counterclockwise, there arises a beat signal that can be expressed in terms of the difference of the oscillation frequency of the first laser beam and that of the second laser beam or equation (4) below;

$$f_2-f_1=f_{20}-f_{10}-(\Delta f_2+\Delta f_1)=f_{20}-f_{10}-[(2A_2/\lambda_2 L_2)\cdot\Omega+(2A_1/\lambda_1 L_1)\cdot\Omega] \tag{4}$$

Meanwhile, when there exist two or more than two different oscillation modes in a laser, the population inversion varies with time as a function of the difference of the oscillation frequencies of the selected mode. This phenomenon is referred to as population pulsation. In the case of a laser where an electric current is made to flow such as a gas laser or a semiconductor laser, the population inversion shows a one-to-one correspondence relative to the impedance of the laser. When two laser beams interfere with each other within such a laser, the population inversion is made to vary by the interference to consequently change the impedance between the electrodes of the laser. The change can be observed as a change in the terminal current when a constant voltage source is used as a drive power source. On the other hand, the change can also be observed as a change in the terminal current and taken out as signal representing the interference of the two beams when a constant current source is used. Of course, it is also possible to directly observe the change in the impedance by means of an impedance meter.

Thus, by providing a terminal for detecting the change in the current, the voltage or the impedance of the laser, it is possible to take out a beat signal representing the number of revolutions per unit time, or the rotary velocity of the laser. Additionally, according to the invention, the beat frequency increases or decreases according to the sense of rotation in a manner as expressed by equations (3) and (4).

Therefore, it is possible to detect the sense of rotation by observing the increase or the decrease, if any, in the beat frequency from the time when the laser is not rotating.

On the other hand, the relationship as expressed by equation (5) below holds true when the oscillation wavelength of the first laser beam and that of the second laser beam are equal to each other.

$$f_{20}-f_{10}=0 \tag{5}$$

Then, the beat frequency $f_2-f_1$ may be either a positive value or a negative value. However, the same and identical signal will be obtained from the terminal so long as the absolute value of the beat frequency remains the same. In that case, it is not possible to detect the sense of rotation of the laser.

However, according to the invention, the sense of rotation can be detected by observing the change in the absolute value of $f_2-f_1$. Additionally, the angular velocity of the laser can be detected in addition to the sense of rotation when $f_2-f_1$ is made to satisfy the relationship expressed by formula (6) below.

$$f_2-f_1 \geq 0 \tag{6}$$

Thus, both the sense of rotation and the angular velocity of the laser can be detected if it is so arranged that the value of the beat frequency is constantly led by the same sign (which is positive in the description below, although it may be negative by the same token) and only the absolute value of the beat frequency changes as a function of the sense of rotation.

Alternatively, it is possible to detect the beat signal by means of an externally arranged photodetector instead of detecting the beat signal by observing the change in the voltage being applied to, the electric current flowing through or the change in the impedance of the semiconductor laser.

More specifically, the first laser beam and the second laser beam are taken out to the outside of the semiconductor laser. Then, as the laser beams are detected simultaneously by the photodetector, they interfere with each other and generate a beat signal within the photodetector as a function of the difference of the oscillation frequencies.

As a result, the beat signal can be detected at the electric terminal of the photodetector.

As pointed out above, the requirement of equation (7) below has to be satisfied for equations (3) and (4) in order to detect not only the angular velocity but also the sense of rotation of the gyro.

$$f_2 - f_1 \neq 0 \quad (7)$$

The requirement of equation (7) above can be met by modifying both the intensity of the laser beam propagating clockwise and that of the laser beam propagating counterclockwise.

Both of the intensities of two laser beams propagating circuitally in opposite directions in a laser can be modified by causing only one of the laser beams to have an optical loss.

For instance, when the optical waveguide is partly and asymmetrically tapered, the conditions of total reflection become modified relative to the light entering the tapered region to give rise to a mirror loss to that light. The angle of incidence of light varies depending on the sense of circuital propagation and the light propagating in one of two directions may show a loss greater than the light propagating in the opposite direction or vice versa. As a result, different values may be selected for the oscillation threshold of the oppositely propagating laser beams. Then, the laser beams propagating in opposite directions show intensities of light that are different relative to each other at the time of laser oscillation.

Meanwhile, it is known that the oscillation frequency $f_i$ and the photon number density $S_i$ show a relationship as expressed by equations (8) and (9) below when two different modes coexist;

$$2\pi f_1 + \dot{\Phi}_1 = \Omega_1 + \sigma_1 - \rho_1 S_1 - \tau_{12} S_2 \quad (8)$$

and $$2\pi f_2 + \dot{\Phi}_2 = \Omega_2 + \sigma_2 - \rho_2 S_2 - \tau_{21} S_1 \quad (9)$$

where $\dot{\Phi}_i$ represents the phase, $\Omega_i$ represents the resonance angle frequency, $\sigma_i$ represents the self mode pulling coefficient, $\rho_i$ represents the self mode pushing coefficient and $\tau_{ij}$ represents the cross mode pushing coefficient. Note that i, j=1, 2; i≠j.

Once the profile of the optical waveguide is determined, $\Omega_i$, $\sigma_i$, $\rho_i$ and $\tau_{ij}$ become a constant.

Additionally, it is considered that $\dot{\Phi}_i = 0$ means no mode jumping occurs at the time of laser oscillation.

Thus, from equations (8) and (9), it is concluded that $f_1 \neq f_2$ when $S_1 \neq S_2$.

Now, how the electric signal of the laser device when it is driven to rotate clockwise or counterclockwise will be briefly discussed below (see FIGS. 1A through 1C).

In the following description, the wavelength of the laser beam propagating clockwise (hereinafter referred to as "CW beam") is expressed by $\lambda_1$ and that of the laser beam propagating counterclockwise (hereinafter referred to as "CCW beam") is expressed by $\lambda_2$ ($\lambda_2 < \lambda_1$).

Figure 1A:
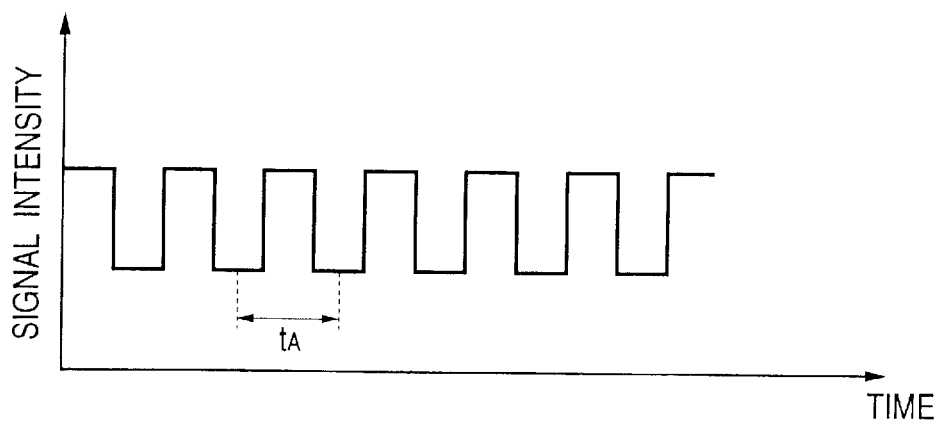
FIGS. 1A, 1B and 1C are graphs showing a change that can be observed in a beat signal caused by the revolution of a gyro.

FIG. 1A shows the electric signal that can be obtained when the laser device is held stationary. Assume here that the electric signal obtained when the laser device is held stationary has a period of $t_A$.

Figure 1B:
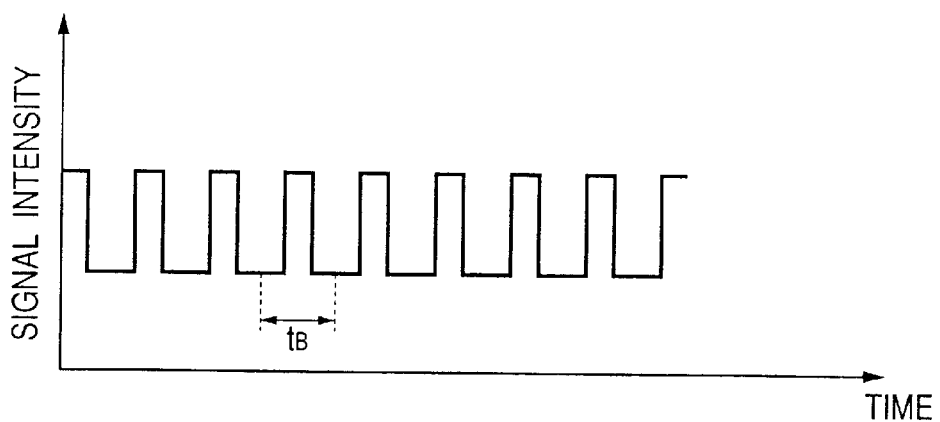

When the laser device is rotated clockwise, the beat frequency $f_2 - f_1$, increases according to equation (3) to reduce the signal period of $t_B$ as shown in FIG. 1B.

Figure 1C:
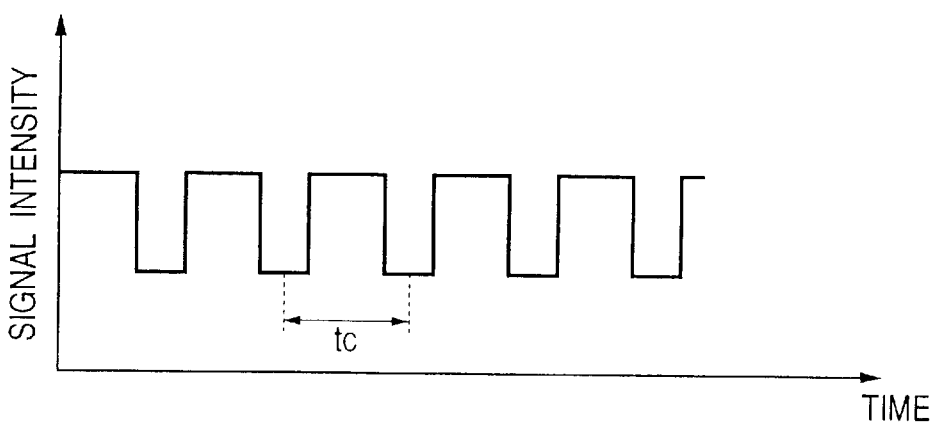

On the other hand, as the laser device is rotated counterclockwise, the beat frequency decreases according to equation (4) to raise the signal period of $t_C$ as shown in FIG. 1C.

Then, the angular velocity of the object under observation can be determined by comparing the period of the electric signal (or the beat frequency) of the laser device when the latter is held stationary and that of the electric signal (or the beat frequency) of the laser device, when the latter is rotating, and determining the absolute value of the difference in the two periods, while the sense of rotation of the object can be detected by comparing them to determine which is greater.

A gyro according to the invention operates on the principle as described above.

Embodiment 1

In a first embodiment of a gyro according to the invention, the gyro comprises a laser device which is driven to generate first and second laser beams that propagate clockwise and counterclockwise respectively, the frequency of the first and second beams being different when the laser device is held stationary and the electric signal it produces is taken out therefrom.

The first and second laser beams (CW beam and CCW beam) can be generated by the laser device by forming an asymmetrically tapered region at least in part of the optical waveguide of the laser device.

Figure 2:
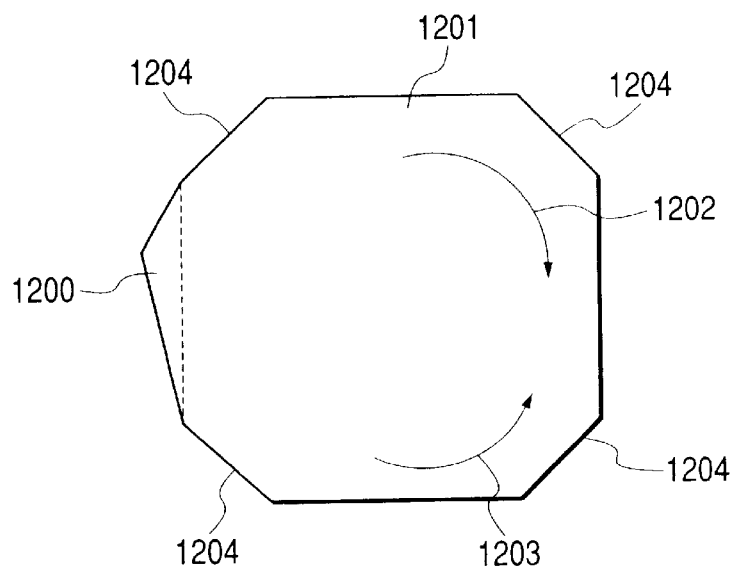
FIG. 2 is a schematic illustration of a first embodiment of the invention.

More specifically, referring to FIG. 2, an asymmetrically tapered region 1200 is arranged in the optical waveguide 1201 of the embodiment. In FIG. 2, reference numeral 1202 denotes a CW beam and reference numeral 1203 denotes a CCW beam, while reference numeral 1204 denotes a mirror (the reflection surface thereof to be more accurate). By forming an asymmetrically tapered region in this manner, there arises a difference between the intensity of light of the CW beam and that of the CCW beam. In other words, there arises a difference between the photon number density of equation (8) and that of equation (9). Then, as described above, the oscillation frequency of the CW beam and that of the CCW beam show a difference. Note that, the tapered region may have any profile so long as it is asymmetric and the two oscillation frequencies show a difference when the laser device is held stationary. However, the tapered region should be arranged in such a way that the difference between the two oscillation frequencies is not smaller than 100 Hz, preferably not smaller than 1 kHz, more preferably not smaller than 10 kHz from the viewpoint of avoiding the locking-in phenomenon. The difference between the two oscillation frequencies is not limited in the above range, if the locking-in phenominon can be prevented with another means.

On the other hand, when the difference in the intensity of light between the CW beam and the CCW beam is too large, the two beams interfere with each other only to a small extent and would not give rise to any beat signal. Therefore, the tapered region should be arranged in such a way that, when the intensity of the more intense light of the two beams is set to 1, that of the weaker light is not less than 30% thereof, preferably not less than 50% thereof, more preferably not less than 80% thereof. It is desirable that the difference in the intensity of light between the two beams is held within the above range by controlling the electric current injected to drive the laser.

Additionally, the asymmetrically tapered region desirably includes a first tapered section gradually broadening the optical waveguide along the direction of laser beam propagation and a second tapered section gradually narrowing the optical waveguide along the direction of laser beam propagation and the profile of the first section and that of the second section are asymmetric relative to a plane perpendicular to the direction of laser beam propagation.

Alternatively, the asymmetrically tapered region may include two or more than two tapered sub-regions.

While the optical waveguide of FIG. 2 has a rectangular profile, it may alternatively have some other polygonal profiles such as a triangular or pentangular profile. Still alternatively, it may have a circular profile.

Figure 3:
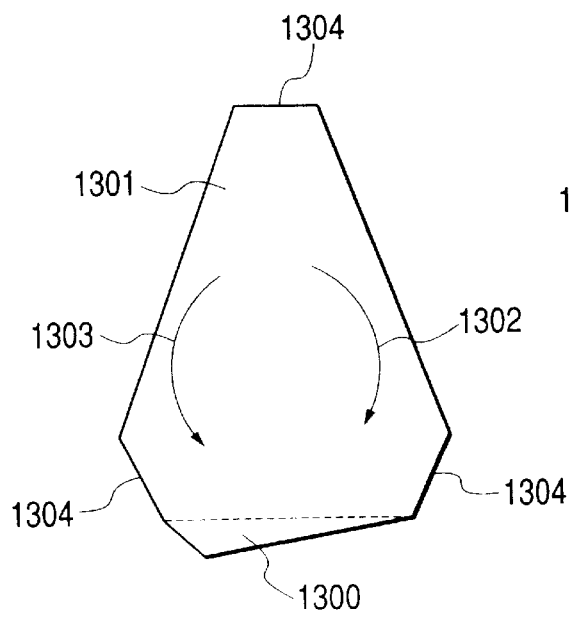
FIG. 3 is another schematic illustration of the first embodiment of the invention.

If the optical waveguide has a triangular profile, it may be tapered in a manner as shown in FIG. 3. If, on the other hand, the optical waveguide has a circular profile, it may be tapered in a manner as illustrated in FIG. 4.

Figure 4:
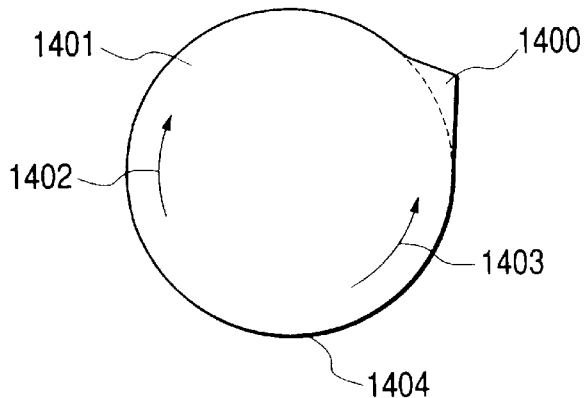
FIG. 4 is another schematic illustration of the first embodiment of the invention.

Referring to FIGS. 3 and 4, reference numerals 1300 and 1400 respectively denote the tapered regions of the optical waveguides and reference numerals 1301 and 1401 denote the respective optical waveguides, whereas reference numerals 1302 and 1402 denote respective CW beams and reference numerals 1303 and 1403 denote respective CCW beams. In FIGS. 3 and 4, reference numerals 1304 and 1404 denote the respective reflection surfaces.

For the purpose of the invention, the laser device may be a gas laser or a semiconductor laser.

Figure 5:
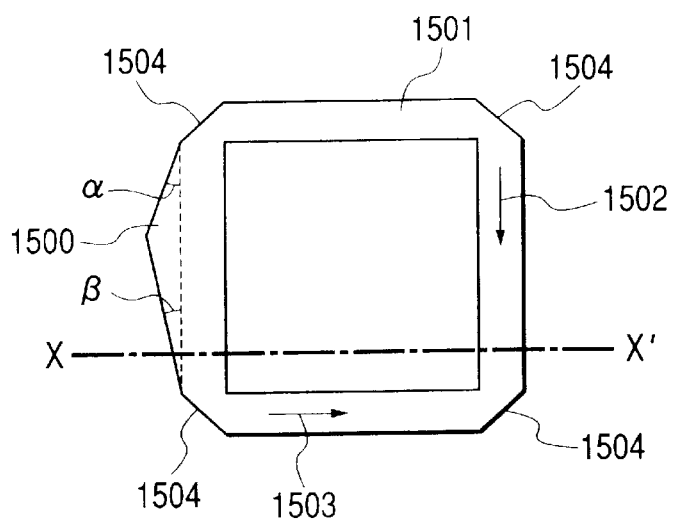
FIG. 5 is another schematic illustration of the first embodiment of the invention.
Figure 6:
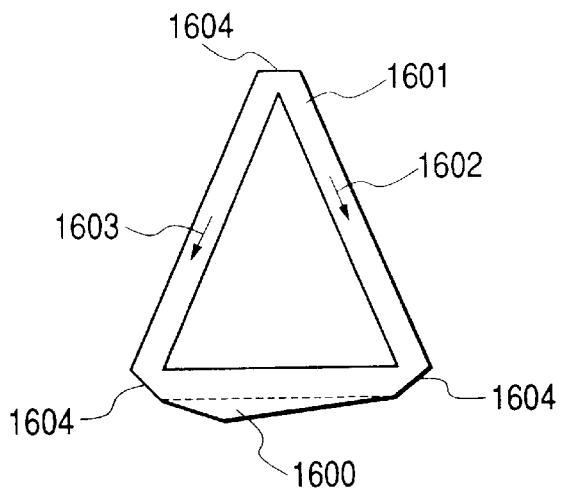
FIG. 6 is another schematic illustration of the first embodiment of the invention.
Figure 7:
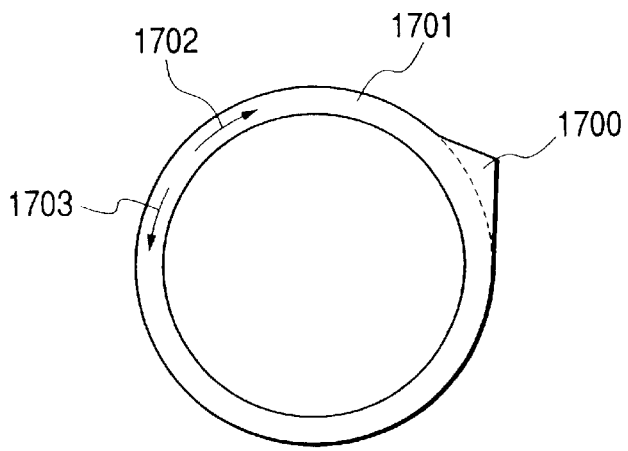
FIG. 7 is another schematic illustration of the first embodiment of the invention.

From the viewpoint of reducing the power required for driving the laser device, it is desirable that the laser device has a ring-shaped profile as illustrated in FIG. 5. Note that FIG. 5 is a schematic plan view of the laser device. In FIG. 5, reference numeral 1501 denotes an optical waveguide and reference numeral 1500 denotes a tapered region, whereas reference numerals 1502 and 1503 respectively denote a CW beam and a CCW beam. Note that the laser device may have a rectangular profile as shown in FIG. 5 or a triangular profile as shown in FIG. 6. Alternatively, it may have a circular profile as shown in FIG. 7. Referring to FIGS. 5 through 7, the tapered region (1500, 1600 or 1700) may be arranged either at the inside or at the outside of the optical waveguide, although the tapered region (1500, 1600 or 1700) is preferably arranged at the outside of the optical waveguide particularly when a locking-in phenomenon can appear as a result of optical coupling of the light leaking out from the tapered region and the laser beam propagating inside the ring laser.

Referring to FIG. 5, the angles $\alpha$ and $\beta$ of the tapered region are preferably not equal to 90° ($\alpha$, $\beta \neq 90°$) because, otherwise, one of the two laser beams can show an extremely low intensity of light.

If $\alpha$, $\beta = 90°$, the waveguide mode changes stepwise at the originating points of the tapered region (the points where the angle is equal to 90°) to make the efficiency of coupling with the corresponding waveguide mode of the region of the optical waveguide having a constant width too low. If, on the other hand, $\alpha$, $\beta \neq 90°$, the mode changes gradually to make it possible to suppress the lowering of the coupling efficiency.

Figure 8:
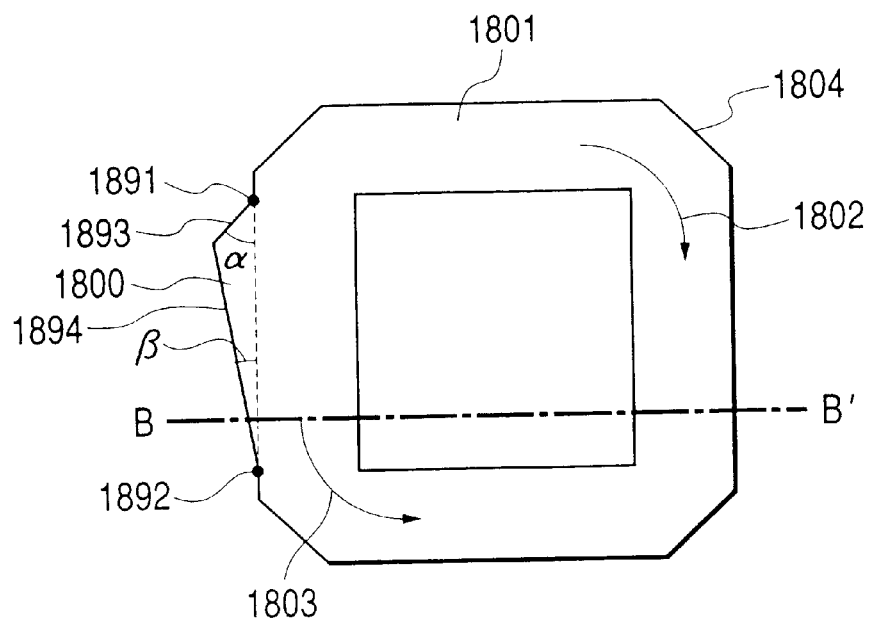
FIG. 8 is still another schematic illustration of the first embodiment of the invention.

If the angles of the tapered region 1800 relative to the line connecting the originating point 1891 of the first tapered section 1893 and the originating point 1892 of the second tapered section 1894 are respectively $\alpha$ and $\beta$ as shown in FIG. 8, the tapered region 1800 of the optical waveguide has to have an asymmetrical profile in order to differentiate the oscillation frequency of the CW beam and that of the CCW beam as described above. Preferably, both $\alpha$ and $\beta$ are greater than 0° and smaller than 180°. Additionally, the angles defined respectively by the first and second tapered regions and the region of the optical waveguides showing a constant width is preferably acute (less than 90°).

FIG. 8 is a schematic illustration of the profile of the tapered region of the laser device of a gyro according to the invention that is adapted to differentiate the oscillation frequency of the CW beam and that of the CCW beam. It should be noted, however, that the positions of the originating points 1891, 1892 of the first and second tapered regions are not limited to those illustrated in FIG. 8. Moreover, the ring laser 1801 may have a profile other than rectangular such as hexangular, triangular or circular. The ring-shaped profile of the laser device will be described in greater detail hereinafter.

As for the electric signal to be taken out from the laser device, it may be a voltage signal when the device is driven by a constant current or it may be a current signal when the device is driven by a constant voltage. Still alternatively, it may be an impedance signal produced by the laser device.

Note that the frequency of the taken out electric signal, which may be a voltage signal, a current signal or an impedance signal, corresponds to the above described beat frequency. Therefore, it is possible to detect the angular velocity and the sense of rotation of the laser device by detecting the change in the frequency.

Now, a possible means for detecting the change in the voltage of the laser device in the form of an electric signal will be discussed hereinafter.

Figure 9:
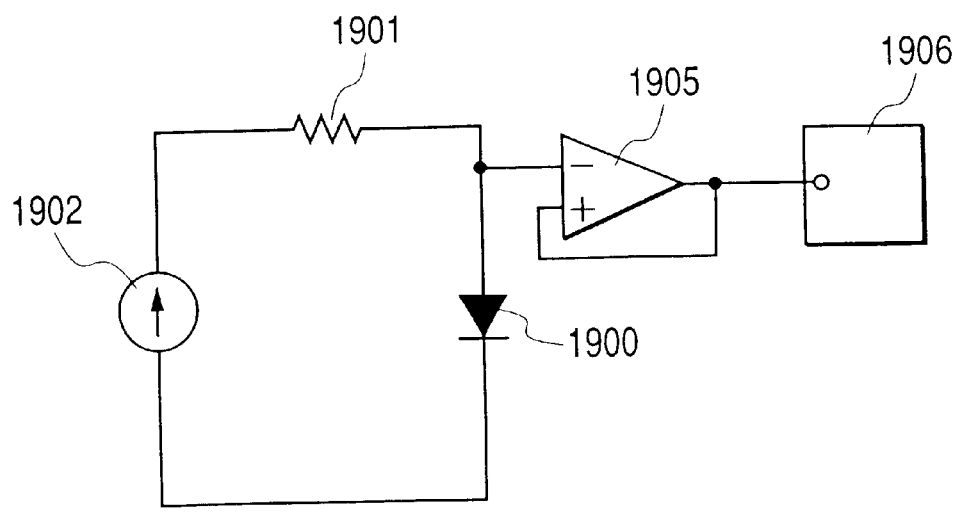
FIG. 9 is a schematic circuit diagram of a circuit adapted for taking out a beat signal.

Referring to FIG. 9, a constant current source 1902 is brought in and connected to a semiconductor laser device 1900 by way of a resistor 1901. Then, the electric signal produced by the semiconductor laser 1900 is read by means of a voltage detection circuit 1906. Note that the electric signal is a voltage signal in this instance. Also note that, when necessary, a voltage follower circuit 1905 is provided as a protective circuit as shown in FIG. 9. While the laser device of FIG. 9 is a semiconductor laser in the above description, a gas laser may alternatively be used for the purpose of the present invention.

FIG. 10 is a schematic circuit diagram of an arrangement where the laser device is driven by a constant current and the change in the anode potential of the semiconductor laser 2000 is read out to detect the rotation of the gyro.

Referring to FIG. 10, the anode of the semiconductor laser 2000 is connected to the output terminal of an operational amplifier 2010 by way of a protective resistor 2003 and the cathode of the semiconductor laser 2000 is connected to the inverting input terminal of the operational amplifier 2010.

Another operational amplifier 2011 outputs signal Vout that corresponds to input potential Vin from a microcomputer. Since the signal Vout shows a beat frequency that is proportional to the angular velocity, the rotation of the laser device can be detected by converting the signal into a voltage by means of a known frequency/voltage converter circuit (F/V converter circuit)

FIG. 11 is a schematic circuit diagram of a frequency/voltage converter circuit (F/V converter circuit). The circuit comprises a transistor, diodes, capacitors and resistors and the output voltage $V_{c2}$ thereof is expressed by formula (10) below;

$$V_{c2}=E_iC_1R_0f/[1+1/\{1-\exp(-1/R_0C_2f)\}] \quad (10)$$

where $E_i$ represents the peak-to-peak value of the input voltage and f represents the beat frequency. By selecting values that realize $C_2>C_1$ and $R_0C_2f<1$ for the circuit parameters, the relationship as expressed by equation (11) below can be established to obtain a voltage output that is proportional to the beat frequency.

$$V_{c2}=E_iC_1R_0f/2 \quad (11)$$

Now, the arrangement for detecting the rotation of the laser device through the change in the electric current will be discussed below.

Figure 12:
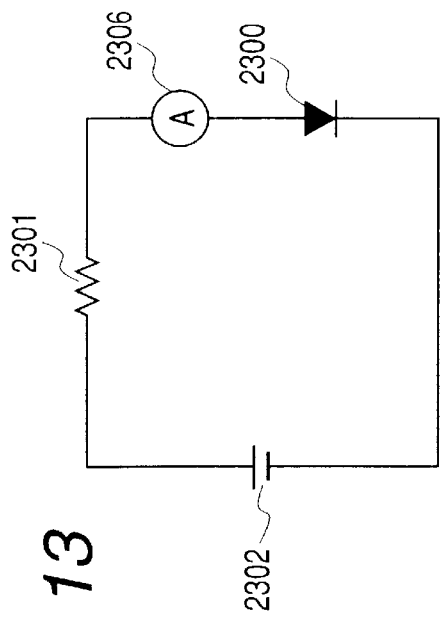
FIG. 12 is a schematic circuit diagram of another circuit adapted for taking out a beat signal.
Figure 13:
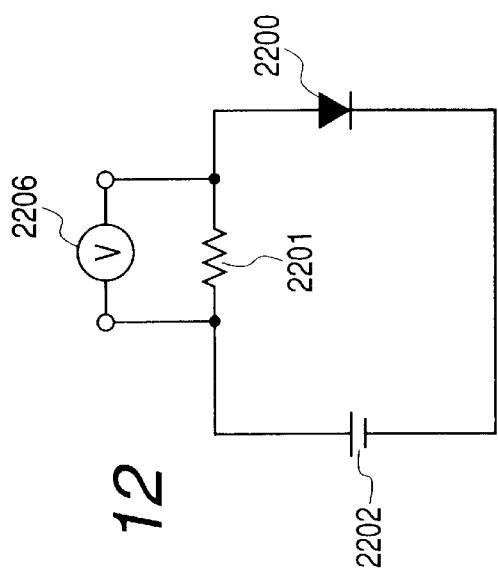
FIG. 13 is a schematic circuit diagram of another circuit adapted for taking out a beat signal.

The angular velocity of the rotating laser device can be determined by detecting the change in the electric current flowing through the semiconductor laser by using a constant voltage source as a power source. A compact and lightweight drive system can be obtained for the laser device by using a battery for the constant voltage source as shown in FIGS. 12 and 13. In the circuit of FIG. 12, the semiconductor laser 2200 is connected to a resistor 2201 in series so that the change in the electric current flowing through the semiconductor laser can be determined as the change in the voltage between the opposite ends of the electric resistor. In FIG. 12, reference numeral 2202 denotes a battery and reference numeral 2206 denotes a voltmeter. In the circuit of FIG. 13, on the other hand, the semiconductor laser 2300 is connected with an ammeter 2306 in series to directly observe the electric current flowing through the semiconductor laser. In FIG. 13, reference numeral 2301 denotes an electric resistor.

Now, another circuit configuration that can be used for detecting a beat signal for the purpose of the invention will be discussed below.

Figure 14:
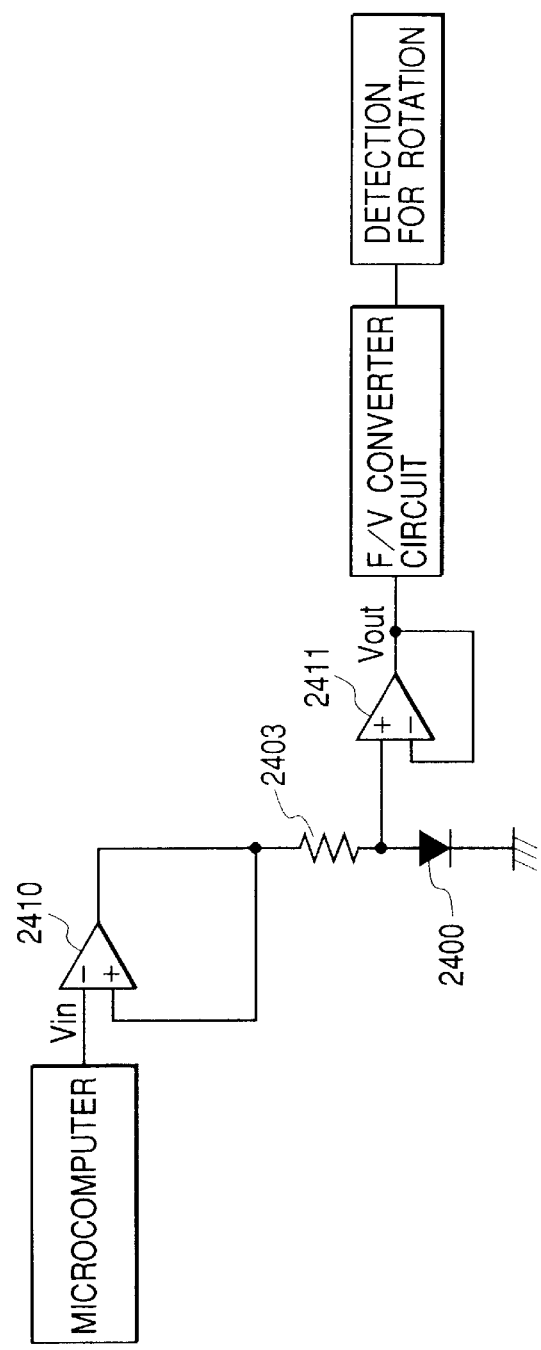
FIG. 14 is a schematic circuit diagram of another circuit adapted for taking out a beat signal.

FIG. 14 is a circuit diagram of a circuit for detecting the rotation of a semiconductor laser 2400 by applying a constant voltage thereto in order to drive it and read the change in the anode potential of the semiconductor laser 2400.

The anode of the laser 2400 is connected to the output terminal of an operational amplifier 2410 by way of a resistor 2403 and the cathode of the laser 2400 is grounded to show a reference potential.

A constant voltage drive arrangement can be obtained by applying a constant potential (Vin) to the inverting input terminal of the operational amplifier 2410 by means of, for instance, a microcomputer, so that the potential may constantly be applied to the resistor 2403 and the laser 2400.

The electric resistor 2403 is connected to another operational amplifier 2411 that operates as buffer.

The operational amplifier 2411 outputs signal Vout, which has a beat frequency that is proportional to the angular velocity so that the rotation of the laser device can be detected by changing the frequency into a voltage by means of a known frequency/voltage converter circuit (F/V converter circuit). It may be needless to say that it is also possible to detect the rotation of the laser device by applying the signal obtained at a point where an electrical potential is equal to that of the electric resistor 2403 directly to the F/V converter circuit. A frequency counter circuit may be used as a beat signal detection circuit.

Figure 15:
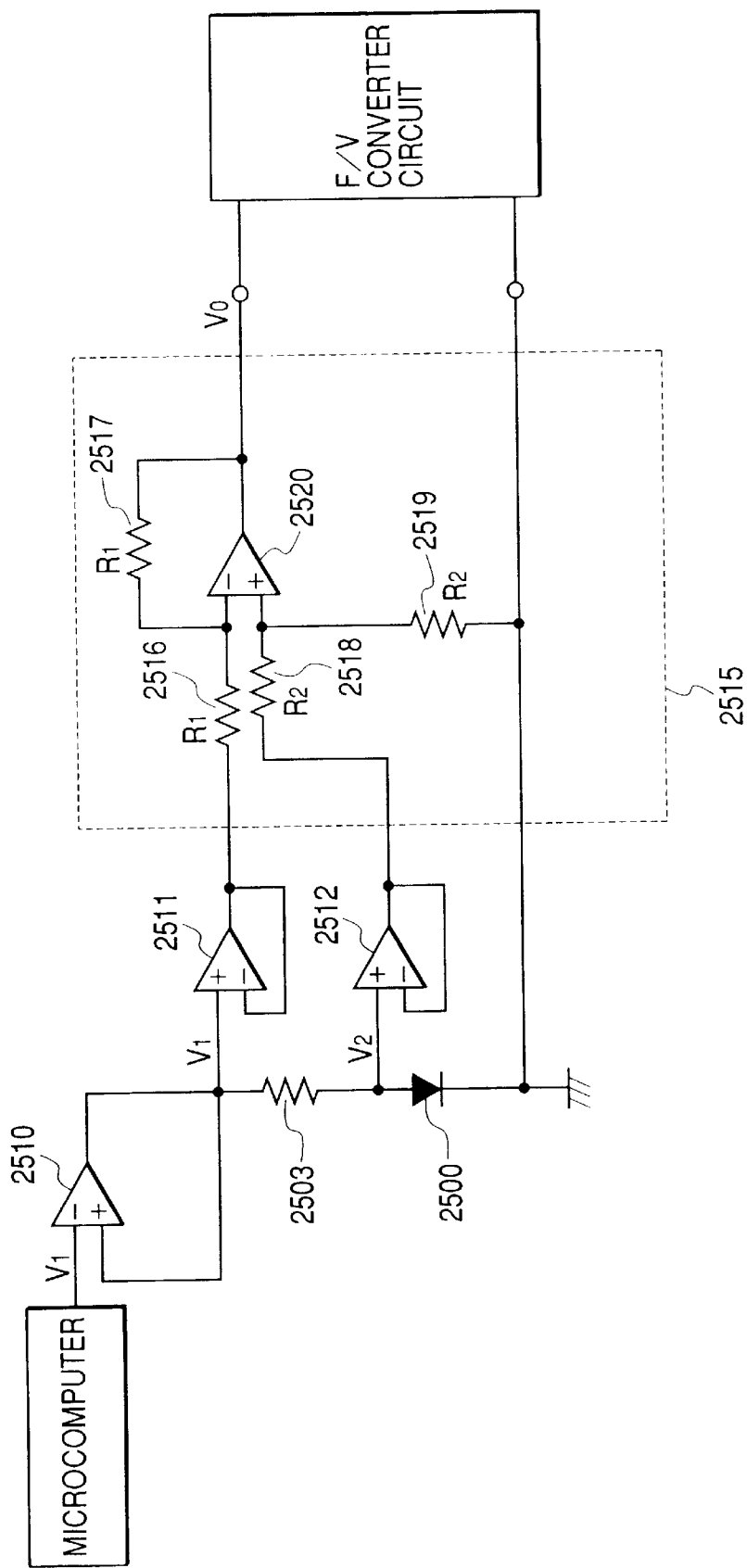
FIG. 15 is a schematic circuit diagram of another circuit adapted for taking out a beat signal.

FIG. 15 shows a circuit diagram of a circuit adapted to use the ground potential as a reference potential for the signal by using a subtraction-circuit 2515 in addition to the above constant voltage drive arrangement.

Referring to FIG. 15, a constant voltage $V_1$ is applied to the inverting input terminal of an operational amplifier 2510 by means of, for instance, a microcomputer. In FIG. 15, a reference numeral 2500 denotes a laser device and reference numerals 2511 and 2512 denote respective voltage followers, while reference numerals 2503 and 2516 through 2519 respectively denote electric resistors. The resistors 2516 and 2517 show a common electric resistance, whereas resistors 2518 and 2519 show a common electric resistance.

The potentials $V_1$ and $V_2$ at the opposite ends of the electric resistor 2503 are applied respectively to the inverting input terminal and the non-inverting input terminal of the operational amplifier 2520 by way of the voltage followers 2511, 2512 and the resistors 2516 and 2518. With this arrangement, the change in the voltage $V_2-V_1(=V_0)$ being applied to the resistor 2503 can be detected to detect the change in the electric current flowing through the laser device 2500 by using the ground potential as reference potential.

Then, the rotation of the laser device can be detected from the obtained signal after making it pass through F/V converter circuit.

Figure 16:
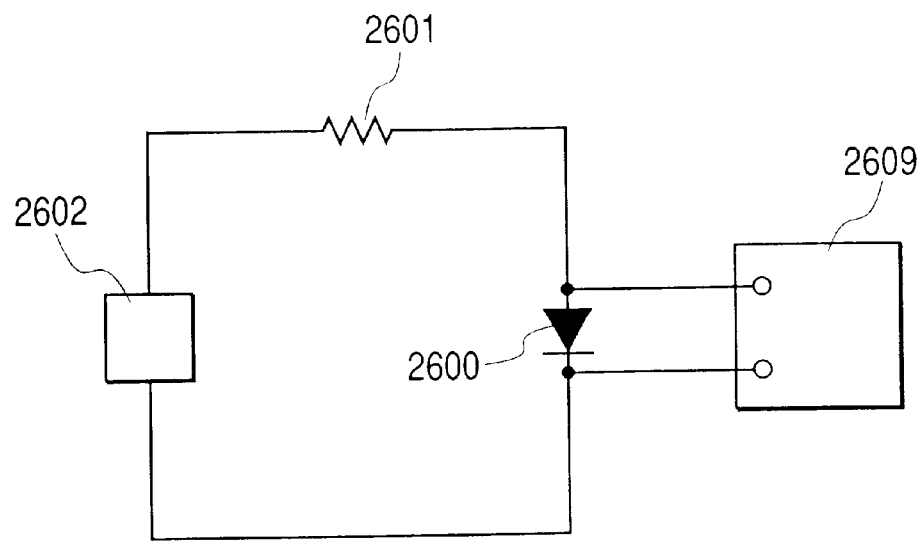
FIG. 16 is a schematic circuit diagram of still another circuit adapted for taking out a beat signal.

It is also possible to observe the change in the impedance of the semiconductor laser 2600 directly by means of an impedance meter 2609 as shown in FIG. 16 regardless of the type of the power source. In FIG. 16, reference numeral 2602 denotes a power source. With this arrangement, the influence of the noise of the drive power source can be reduced unlike the case where the terminal voltage applied to or the electric current flowing through the laser device is observed.

While various arrangements for detecting the rotation of a laser device are described above in terms of a semiconductor laser, it will be appreciated that the above description equally applies to a gas laser.

Embodiment 2

The second embodiment of gyro according to the invention comprises a laser device and a photodetector for detecting the CW beam and the CCW beam emitted from the laser device and interfering with each other, the oscillation frequencies of the two beams being not equal to each other.

This second embodiment differs from the above described first embodiment in that the photodetector is arranged outside the laser device and the rotation of the laser device is detected by way of the change in the electric signal of the photodetector.

Now, the second embodiment will be described in detail by referring to FIG. 17.

Figure 17:
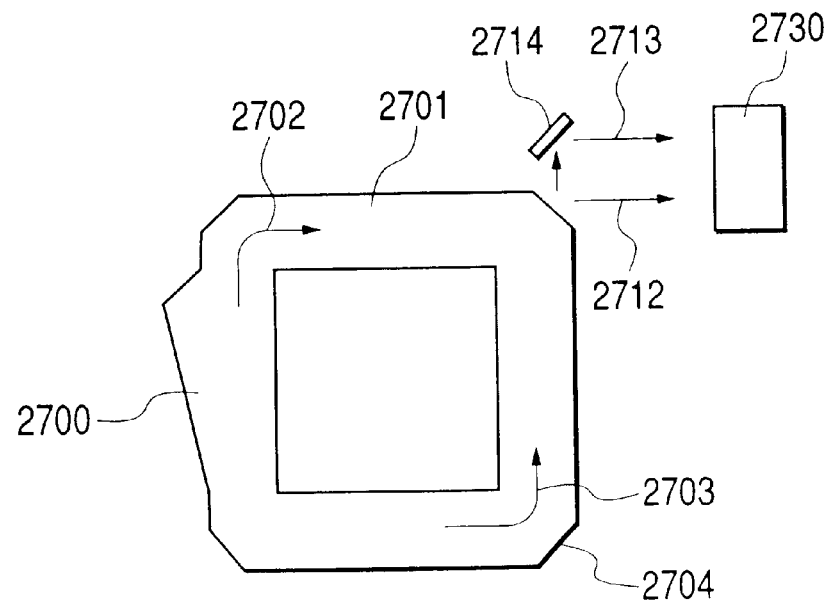
FIG. 17 is a schematic illustration of a second embodiment of the invention.

In FIG. 17, reference numerals 2702 and 2703 respectively denote a CW beam and a CCW beam and a reference numeral 2701 denotes an optical waveguide, while a reference numeral 2700 denotes an asymmetrically tapered region and reference numerals 2704 and 2714 denote respective mirrors. A reference numeral 2730 denotes a photodetector and a reference numeral 2712 denotes the CW beam that is emitted to the outside and eventually enters the photodetector 2730 by way of a mirror 2414 whereas a reference numeral 2713 denotes the CCW beam that is emitted to the outside and eventually enters the photodetector 2730 by way of the mirror 2414.

The photodetector detects the change in the electric signal to detect the rotation of the object being observed.

For the purpose of the invention, a photodetector is a device adapted to transform and detect the intensity of light into an electric signal, which may be a photoelectric tube utilizing emission of photo-electrons (an external photoelectric effect) or a photomultiplier tube. Alternatively, it may be a device selected from various devices utilizing an internal photoelectric effect such as a photoconductive cell making use of a photoconductive effect, a photodiode, a phototransistor, an avalanche photodiode or a photovoltaic cell making use of a photovoltaic effect. Still alternatively, it may be a thermocouple detector which is a heat detector making use of absorption of light, a bolometer, a Golay cell or a pyroelectric photodetector making use of a pyroelectric effect.

Note again that a laser device according to the invention may be a semiconductor laser or a gas laser.

Two preferred embodiments of the invention are described above. Now, a ring-shaped laser device that can be advantageously used for the purpose of the invention will be discussed in detail.

Figure 18:
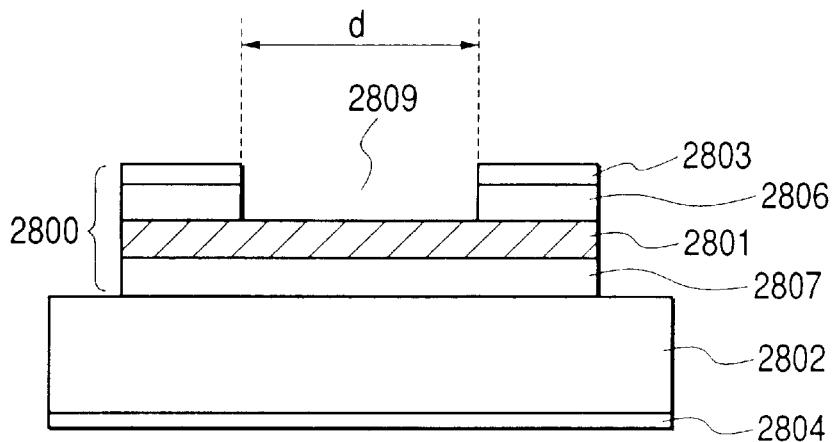
FIG. 18 is a schematic cross-sectional view of a laser device according to the invention.

FIG. 18 is a schematic cross-sectional view of the semiconductor laser of FIG. 5 taken along line X–X' in FIG. 5. In FIG. 18, a reference numeral 2800 denotes the semiconductor laser and reference numerals 2801, 2802 and 2803 respectively denote an active layer, a substrate and an anode, while reference numerals 2804, 2806 and 2807 respectively denote a cathode, an upper cladding layer and a lower cladding layer.

With this arrangement of removing a central portion 2809 of the upper cladding layer 2806 (to produce a ring-shaped profile). An electric current can hardly flow through the central portion of the semiconductor laser. Therefore, principally, only beams that propagate circuitally can obtain a gain to suppress any inutile electric currents. Then, the beat frequency will be highly stabilized particularly when a single transversal mode is realized.

While neither an optical guiding layer nor a cap layer are specifically shown in FIG. 18, such layers may be arranged if a central portion of the upper cladding layer 2806 is removed.

Figure 19:
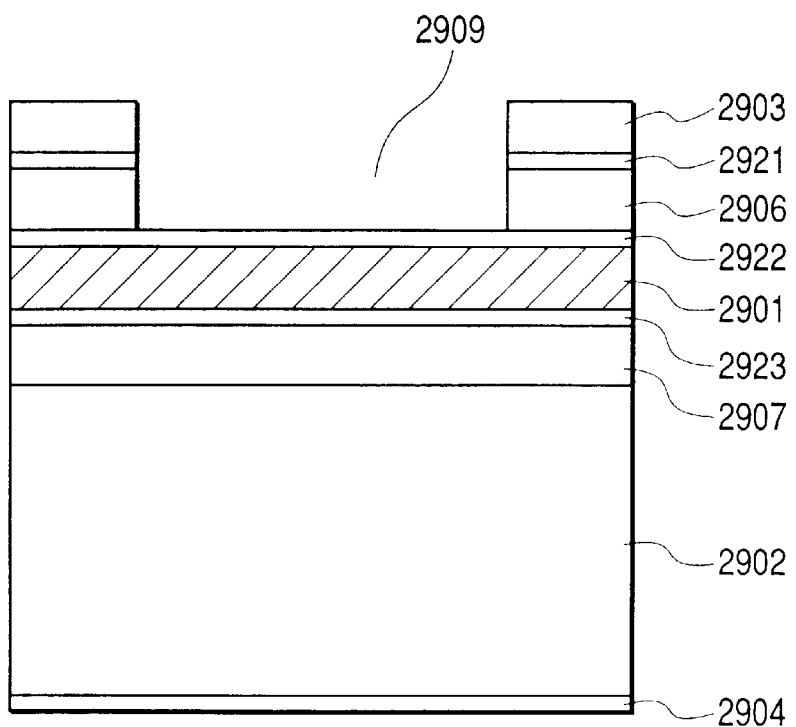
FIG. 19 is a schematic cross-sectional view of another laser device according to the invention.

FIG. 19 shows an arrangement using such layers. More specifically, in FIG. 19, a reference numeral 2921 denotes a cap layer and reference numerals 2922 and 2923 denote optical guiding layers. Otherwise, there are also shown an active layer 2901 and a cathode 2904.

It is also possible to provide a ring-shaped electrode 2903 without modifying the upper cladding layer 2906 and the cap layer 2921. While the anode 2903 is arranged on the entire surface of the laser device in FIG. 19, it is by no means necessary to arrange an anode on the entire surface of the laser device.

Figure 20:
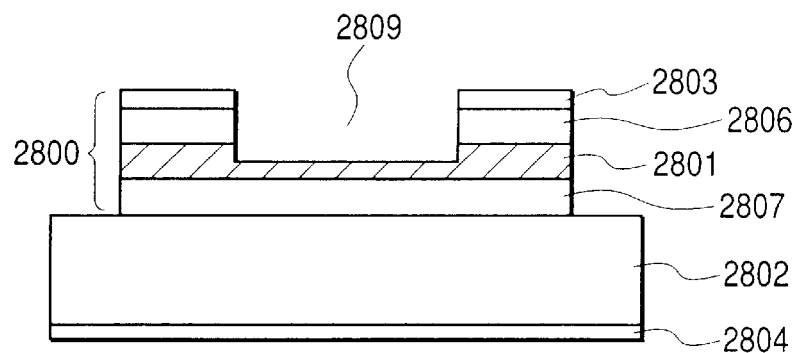
FIG. 20 is a schematic cross-sectional view of another laser device according to the invention.
Figure 21:
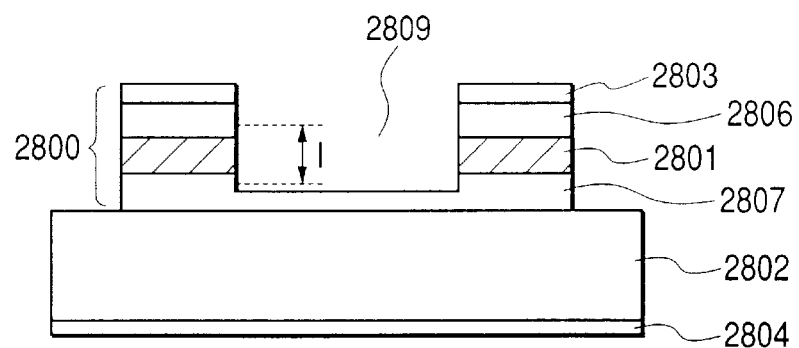
FIG. 21 is a schematic cross-sectional view of another laser device according to the invention.

Additionally, the active layer 2801 may be partly or entirely ring-shaped as seen in FIG. 20 and the lower cladding layer 2807 may also be partly ring-shaped as shown in FIG. 21. It will be appreciated that the threshold current can be reduced efficiently when the active layer is partly ring-shaped because the volume of the active layer is significantly reduced.

For the purpose of the invention, the ring-shape advantageously prevails within the region where laser beams are distributed (as indicated by l in FIG. 21). Thus, it is advantageous that the active layer is ring-shaped.

If the active layer has a thickness of 0.1 μm, l in FIG. 21 is preferably about 1 μm.

Particularly, the optical confinement coefficient of the laser device with regard to the active layer will be large enough to allow a low drive current and stabilize the oscillation frequency when the laser device is ring-shaped within the reach of seeping light in a direction perpendicular to the surface of the active layer. It may be needless to say that the entire semiconductor laser 2800 may have a ring shape.

While the reach l of seeping light is found within the cladding layers 2806, 2807 in FIG. 21, light may seep out beyond the cladding layers depending on parameters including the refractive index and the thickness of each of the cladding layers. If such is the case, the part of the laser device corresponding to the reach l of seeping light is preferably of a cylindrical shape. Additionally, if light seeps out into the optical guiding layer located between the active layer and the cladding layers and also into the substrate 2802, the part of the optical guiding layer and the substrate corresponding to the reach of the seeping light is preferably of a cylindrical shape.

It is desirable that the loss of light in the low refractive index layers 2806, 2807 is minimized. Particularly, the loss of light should be reduced when the laser device should be driven with a low electric current or a low voltage.

Figure 22:
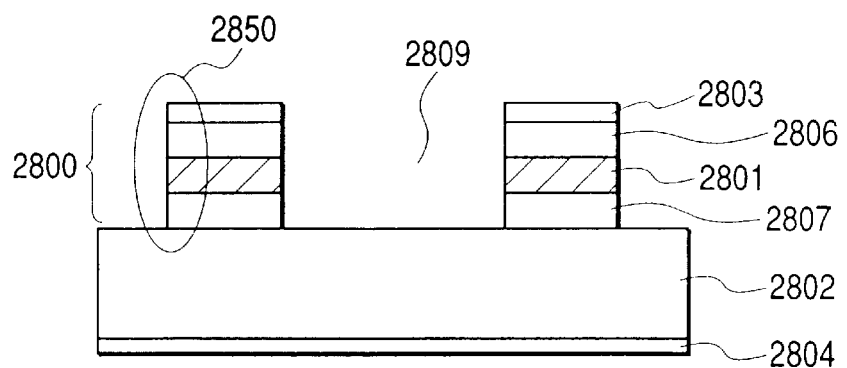
FIG. 22 is a schematic cross-sectional view of another laser device according to the invention.
Figure 23:
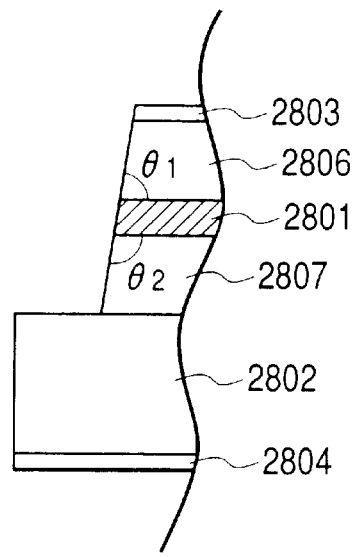
FIG. 23 is an enlarged schematic cross-sectional view of a region of the laser device of FIG. 22.

FIG. 23 is an enlarged schematic cross-sectional view of region 2850 of the laser device of FIG. 22. When the device is to be driven with low electric power, the laser device should be prepared in such a way that the angles $\theta_1$ and $\theta_2$ between the respective lateral surfaces of the low refractive index layers and that of the active layer (FIG. 23) are defined respectively by $75° \leq \theta_1$ and $\theta_2 \leq 105°$, preferably by $80° \leq \theta_1$ and $\theta_2 \leq 100°$, most preferably by $85° \leq \theta_1$ and $\theta_2 \leq 95°$.

When the above requirements are met, any loss of light seeping into the low refractive index layers 2806, 2807 (evanescent light) can effectively be avoided to make it possible to drive the semiconductor laser with a low electric current (or a low voltage).

Additionally and desirably, the lateral surfaces of the semiconductor laser are total reflection surfaces and the angles between the respective areas that are more than 90% of the total reflection surfaces and that of the active layer are defined by the above formulas.

It is also desirable that the lateral surfaces of the low refractive index layers satisfy the above requirements with the corresponding lateral surface of the active layer for all the periphery thereof. Particularly, it is highly desirable that the inner lateral surfaces of the laser device also satisfy the above requirements for angles $\theta_1$ and $\theta_2$.

The surface precision (surface coarseness) of the lateral surfaces of the low refractive index layers sandwiching the active layer 2801 is preferably less than a half, more preferably less than a third, of the wavelength of light transmitting through the transmission medium of the active layer (=wavelength of light in vacuum/effective refractive index of the medium). For instance, if the active layer is an InP type layer (with a wavelength of 1.55 μm and an effective refractive index of 3.6 in the medium), the surface precision is preferably less than about 0.22 μm, more preferably less than 0.14 μm.

If the active layer is a GaAs type layer (with a wavelength of 0.85 μm and an equivalent refractive index of 3.6), the surface precision is preferably less than about 0.12 μm, more preferably less than 0.08 μm.

It may be needless to say that not only the lateral surfaces of the low refractive index layers but also that of the active layer may show the above identified value for the surface precision.

The ring-shaped part of the laser device may preferably be filled with an insulating material (dielectric thin film), although no such insulating material may be needed nor the hollow section of the device may have to be filled when the laser device shows required characteristics without such a filling material.

Figure 24:
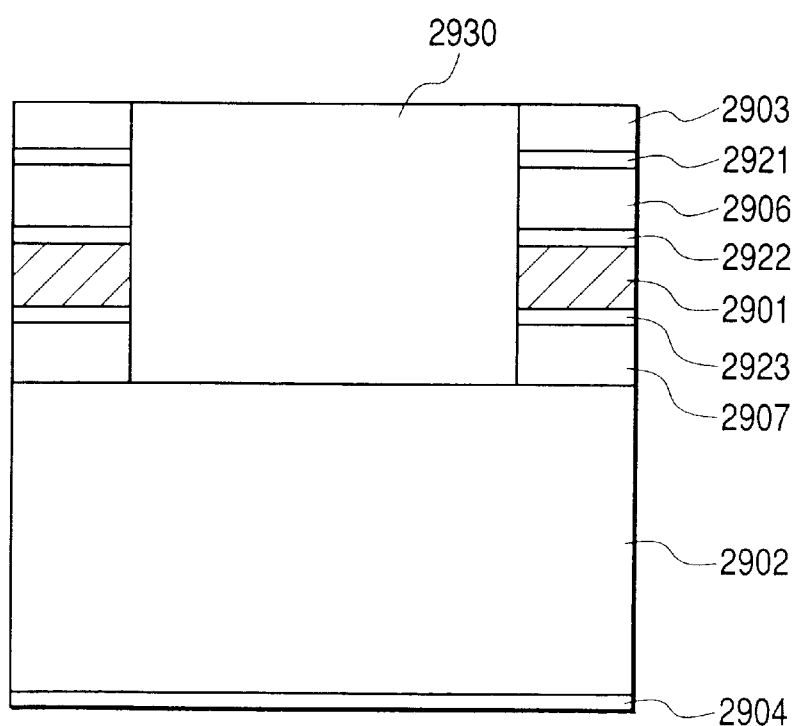
FIG. 24 is a schematic cross-sectional view of another laser device according to the invention.
Figure 25:
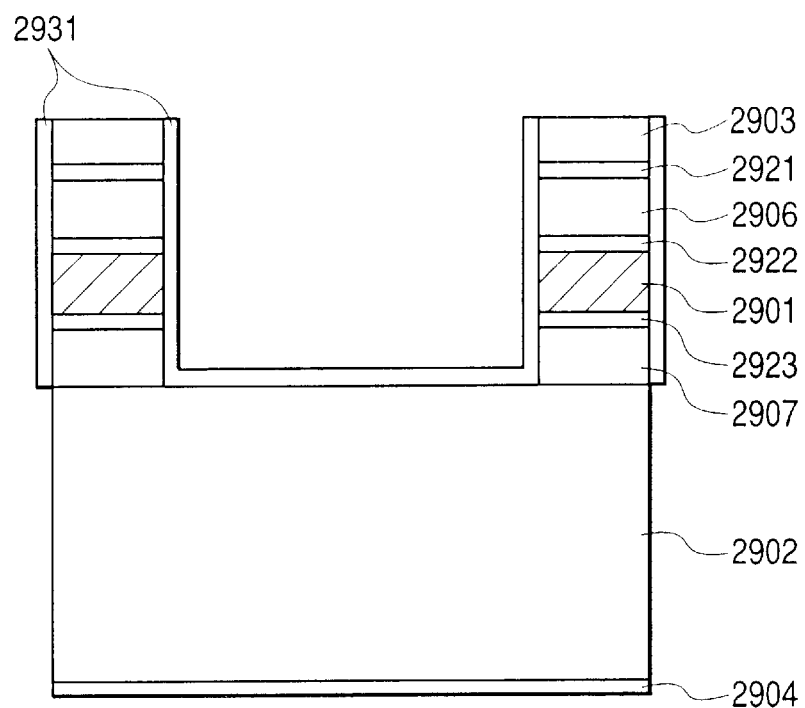
FIG. 25 is a schematic cross-sectional view of another laser device according to the invention.

Any appropriate material may be used for the dielectric thin film if it shows a specific resistance higher than that of the cladding layers, although it is preferably made of amorphous Si, $SiO_2$, MgO or SiN. A total reflection surface may be formed inside the cylindrical section of the laser device by means of the filling material. Additionally, the hollow section of the device may preferably be filled with a single material 2930 as shown in FIG. 24 or with a mixture of two or more than two materials. Still additionally, at least either the inner lateral surface or the outer lateral surface of the active layer may preferably be coated with a thin film 2931 as shown in FIG. 25. If such is the case, the operating characteristics of the device can be prevented from being degraded as a result of exposure to ambient air while saving the material for filling the hollow section of the device. While the coating film has a single layer in FIG. 25, it may alternatively have two or more than two layers.

When the dielectric thin film is made to have a multilayer structure, it may preferably comprise a number of paired layers of $SiO_2$ and Si. The hollow section of the device does not have to be completely filled when the device provides desired operating characteristics without requiring such a filling operation.

Other possible filling arrangements that can be used for the present invention will be discussed briefly below.

Figure 26:
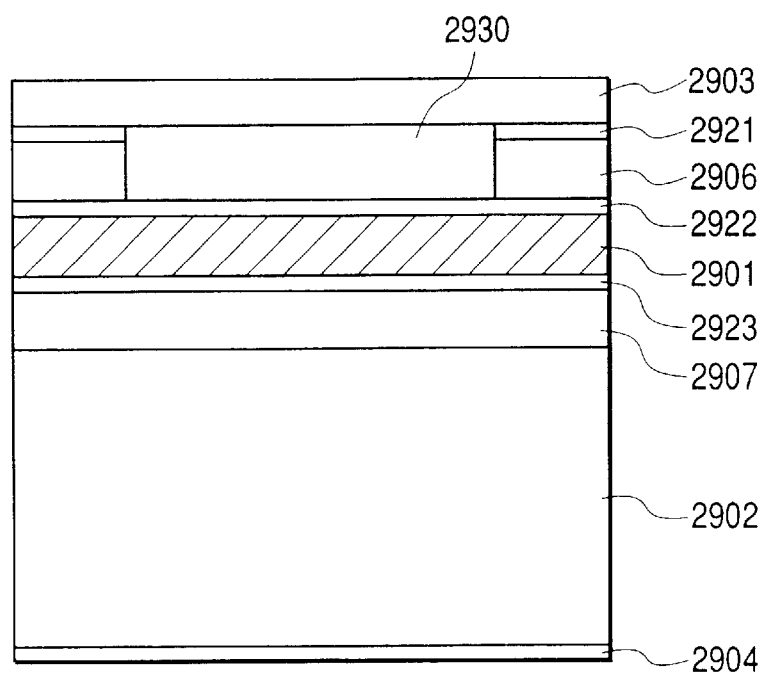
FIG. 26 is a schematic cross-sectional view of another laser device according to the invention.

In FIG. 26, a reference numeral 2930 denotes an insulating film. The arrangement of FIG. 26, in which the insulating film 2930 is arranged under the anode 2903 at a central area thereof, may preferably be used for the purpose of the invention because any electric current would hardly flow through the central portion of the semiconductor laser and therefore the reactive current, if any, would be reduced to make a single transversal mode appear with ease. Such an arrangement is particularly effective when it is desired to provide the electrode with a flat profile.

When the upper cladding layer 2906 is of the p-type, type, the central portion of the laser device will be made to show a PNPN thyristor structure and hardly allow any electric current to flow therethrough by filling the central portion of the laser device with a material showing a PNP type electric conductivity in place of using an insulating film 2930.

Figure 27:
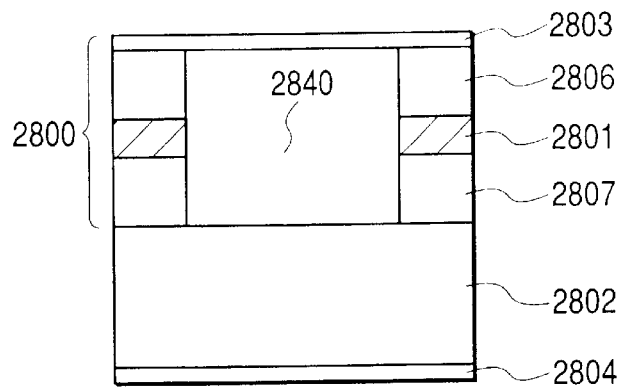
FIG. 27 is a schematic cross-sectional view of another laser device according to the invention.

Referring to FIG. 27, reference numeral 2840 here denotes an Fe-doped high resistance layer. With the arrangement of utilizing a high resistance layer, it is also possible to make the central portion of the semiconductor laser device hardly allow an electric current to flow therethrough.

It may be sufficient for a semiconductor laser according to the invention that the hollow section 2809 (as in FIG. 22) of the active layer is located substantially at the center. A state where no guided mode exists is referred to as cut-off state and it is desirable that the device is so configured as to meet the requirements of cut-off state for higher modes in order to stabilize the transverse mode. Additionally, it is desirable that the diameter d (FIG. 18) of the hollow section is so defined as to meet the requirements of cut-off state for higher modes.

Then, there exists only a basic mode for the transverse mode to stabilize the latter when the requirements of cut-off state are met for higher modes.

It is also desirable that the profile of the hollow section is so defined as to meet the requirements of cut-off state for higher modes so that there may exist only a single guided mode (single transverse mode).

A laser device having a hollow section may be prepared by laying ring-shaped semiconductor layers for the active layer, the optical guiding layer and the cladding layers, typically using masks for them. Alternatively, a laser device having a hollow section may be prepared by laying an active layer, an optical guiding layer and cladding layers and cutting out a central portion thereof to make them show a ring-shaped profile.

Etching techniques that may be used for the purpose of the invention for forming the hollow section include wet etching, gas etching, plasma etching, sputter etching, reactive ion etching (RIE) and reactive ion beam etching (RIBE).

Materials that can be used for the active layer of a laser device according to the invention include among others GaAs, InP, ZnSe, AlGaAs, InGaAsP, InGaAlP, InGaAsP, GaAsP, InGaAsSb, AlGaAsSb, InAsSbP, PbSnTe, GaN, GaAlN, InGaN, InAlGaN, GaInP, GaInAs and SiGe.

Any material that can be used for the active layer may also be used for the cladding layers.

Combinations of materials that can be used for the active layer and the cladding layers for the purpose of the invention include among others PbSnTe (active layer)/PbSeTe (cladding layers), PbSnSeTe (active layer)/PbSeTe (cladding layers), PbEuSeTe (active layer)/PbEuSeTe (cladding layers), PbEuSeTe (active layer)/PbTe (cladding layers), InGaAsSb (active layer)/GaSb (cladding layers), AlInAsSb (active layer)/GaSb (cladding layers), InGaAsP (active layer)/InP (cladding layers), AlGaAs (active layer)/AlGaAs (cladding layers) and AlGaInP (active layer)/AlGaInP (cladding layers).

As for the structure of the semiconductor laser, the active layer thereof is not limited to the bulk structure and may alternatively be of the single quantum well (SQW) structure or of the multiple quantum well (MQW) structure.

When using a laser device of the quantum well structure, it is preferable that the structure is of the strained quantum well structure. For instance, the active layer may be formed by using eight InGaAsP quantum well layers with compression strain of about 1% and an InGaAsP barrier layer. It is also possible to make the active layer show an MIS structure.

As for the substrate, a substrate adapted to make desired materials grow thereon may be used for it. Substrates that can be used for the purpose of the invention include compound substrates such as a GaAs substrate, an InP substrate, a GaSb substrate, an InAs substrate, a PbTe substrate, a GaN substrate, a ZnSe substrate and a ZnS substrate along with an SiC substrate, a 4H-SiC substrate, a 6H-SiC substrate, a sapphire substrate, a silicon substrate and an SOI substrate.

Techniques that can be used for forming the active layer of a semiconductor laser according to the invention include liquid phase epitaxy (LPE technique), molecular beam epitaxy (MBE technique), metal organic vapor phase growth (MOCVD technique, MOVPE technique), atomic layer epitaxial growth (ALE technique), metal organic molecular beam epitaxy (MOMBE technique) and chemical beam expaxy (CBE technique).

Materials that can be used for the anode of a laser device according to the invention include Cr/Au, Ti/Pt/Au and AuZn/Ti/Pt/Au. Materials that can be used for the cathode of a laser device according to the invention include AuGe/Ni/Au and AuSn/Mo/Au. However, the present invention is by no means limited thereto.

Note that the arrangement of the electrodes may be reversed from the illustrated arrangement depending on the conductivity of the substrate and that of the active layer.

It is also preferable that a cap layer (contact layer) is formed on the cladding layers and then the materials of the electrode are arranged on the cap layer in order to reduce the contact resistance of cladding layers and the electrodes.

A typical combination of materials may be InGaAsP (active layer)/p-type InP (cladding layers)/p-type InGaAsP (cap layer)/electrodes.

Note again that, while the cathode is arranged under the substrate in the drawings, the cathode may alternatively be arranged above the substrate depending on the type of the substrate.

In order to protect the semiconductor laser against heat, it is preferable to arrange the semiconductor laser chip on a heat emitting member (heat sink). Materials that can be used for the heat sink for the purpose of the invention non-limitatively include Cu, Si, SiC, AlN and diamond. If necessary, a Peltier device may be used for controlling the temperature of the semiconductor laser.

It is also preferable to form an insulating film (coating film) on each of the lateral surfaces of the semiconductor laser (where light is found) in order to make it a total reflection surface and prevent it from degrading. Materials that can be used for the coating film include insulators such as $SiO_2$, SiN, $Al_2O_3$ and $Si_3N_4$ and amorphous silicon (α-Si).

It is also preferable to replace the hollow section of the ring-shaped laser device with an electrically highly resistive material in order to realize a practically ring-shaped optical waveguide.

Figure 28:
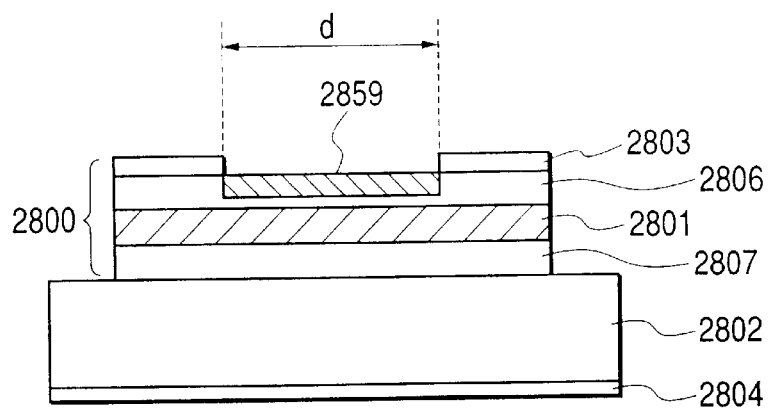
FIG. 28 is a schematic cross-sectional view of another laser device according to the invention.
Figure 29:
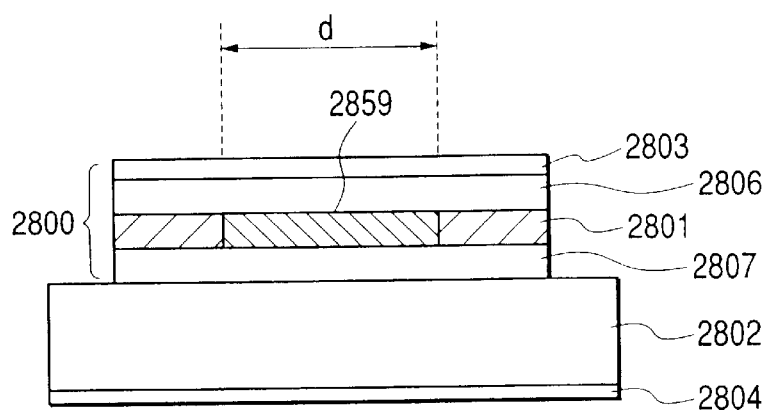
FIG. 29 is a schematic cross-sectional view of still another laser device according to the invention.

FIG. 28 shows a schematic cross-sectional view of a laser device having such an arrangement.

Referring to FIG. 28, the laser device comprises an active layer 2801, a substrate 2802, an anode 2803, a cathode 2804, an upper cladding layer 2806, a lower cladding layer 2807 and a high resistance region 2859 produced by ion implantation. With this arrangement, any electric current can hardly flow through the central portion of the device so that mainly only the beams that are propagating circuitally can obtain a gain.

While the high resistance region 2859 in FIG. 28 has clear boundary lines, in reality they have a certain width. The operation of ion implantation is desirably conducted in such a way that the trajectories of projected ions are mainly found in the active layer.

While at least part of the upper cladding layer is made to be electrically highly resistive in the description made above by referring to FIG. 28, the active layer 2801 and/or the lower cladding layer 2807 may also be made to be electrically highly resistive if the central region can hardly allow any electric current to flow therethrough. Thus, all the central region of the semiconductor laser may be made to be electrically highly resistive.

Therefore, it will be appreciated that if the central region of the active layer 2801 is made to be electrically highly resistive, the volume of the active layer is substantially reduced to by turn reduce the drive current necessary for driving the device.

It is possible to implant ions in such a way that their projection trajectories are mainly found at and around the depth of the active layer so that the device may be made to be electrically highly resistive mainly at such depth.

While the anode 2803 is arranged around the semiconductor laser in FIG. 28, it may alternatively be arranged on the entire upper surface of the laser device. Still alternatively, it may be arranged in part of the upper surface of the laser device.

Whenever appropriate, an optical guiding layer and/or a cap layer may be provided.

The expression of electrically highly resistive as used herein refers to a region implanted with ions and made to show a specific resistance between 100 Ω·cm and $10^5$ Ω·cm, preferably between $5 \times 10^3$ Ω·cm and $1 \times 10^5$ Ω·cm, although the values may vary depending on the type of the active layer.

Ions to be implanted may be protons or boron ions.

It is also desirable that the operation of ion implantation is conducted in such a way that the projection trajectories Rp of implanted ions are mainly found at the center of the active layer. The voltage to be applied to accelerate ions is preferably between 10 KeV and 1 MeV, although the materials and the thicknesses of the cladding layers and the optical guiding layer on the active layer have to be taken into consideration.

Ions may be implanted at a rate between $1 \times 10^{13}$ cm$^{-2}$ and $1 \times 10^{15}$ cm$^{-2}$.

The substrate may be held to room temperature during the operation of ion implantation.

It is not necessary to limit the area of ion implantation strictly to the central region of the semiconductor laser and it is sufficient for the area where ions are implanted to be found roughly at the center of the device if the requirements of cut-off state for higher modes are met.

The diameter d of the region to be implanted with ions may also be defined so as to meet the requirements of cut-off state for higher modes.

The region to be implanted with ions may not necessarily be circular and it may show a contour adapted to meet the requirements of cut-off state for higher modes and allow only a single waveguide mode (single transversal mode) to exist.

It is also desirable to anneal the laser device to heal the damage produced by the ion implanting operation. Such an annealing operation is conducted at a temperature between 200° C. and 500° C., preferably between 300° C. and 400° C. The annealing operation may be conducted in a hydrogen-containing atmosphere.

While an ion implanting operation is described above to make the device have an electrically highly resistive region in it, an electrically highly resistive region may alternatively be produced by selectively oxidizing the region.

Preferred embodiments of the present invention are described above. It should be noted that a gyro according to the present invention may be an instrument with which the angular velocity and the sense of rotation of an object can be detected or an instrument with which only the angular velocity or the sense of rotation of an object can be detected.

EXAMPLE 1

Figure 30:
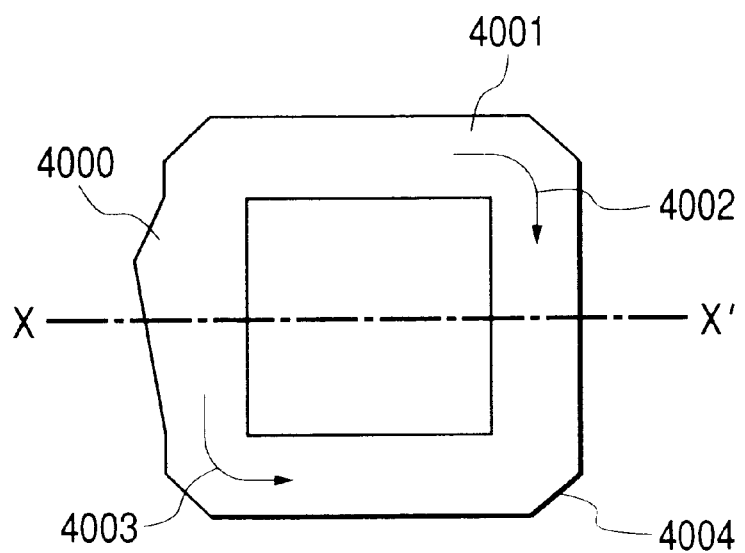
FIG. 30 is a schematic illustration of an example as described hereinafter for the purpose of the invention.
Figure 31:
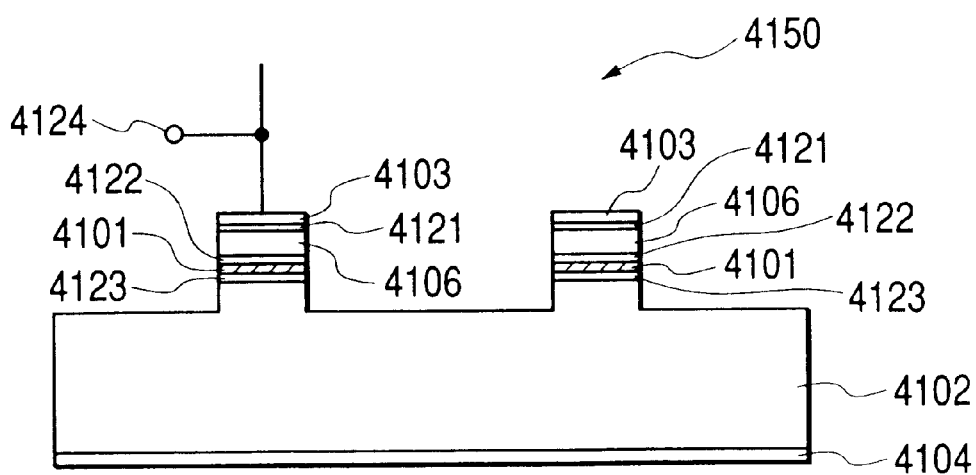
FIG. 31 is another schematic illustration of the example.

FIGS. 30 and 31 are schematic illustrations of the first example of the invention, most clearly showing its characteristic aspects. Referring to FIG. 30, the laser device of this example is a ring resonator type semiconductor laser 4001 that comprises an asymmetrically tapered region 4000 of the optical waveguide thereof. Referring to FIG. 31 also illustrating the laser device of this example, it additionally comprises an anode 4103, an electric terminal 4124, a cap layer 4121, a cladding layer 4106, an optical guiding layer 4122, an active layer 4101, another optical guiding layer 4123, a semiconductor substrate 4102 and a cathode 4104. A reference numeral 4003 denotes a laser beam propagating circuitally counterclockwise and reference numeral 4002 denotes a laser beam propagating circuitally clockwise. Note that FIG. 31 is a schematic cross sectional view of the laser device of FIG. 30 taken along line X–X' in FIG. 30.

Firstly, the method for preparing the ring resonator type semiconductor laser having the above described configuration will be described. An undoped InGaAsP optical guiding layer 4123 having a 1.3 μm composition (0.15 μm thick), an undoped InGaAsP active layer 4101 having a 1.55 μm composition (0.1 μm thick), another undoped InGaAsP optical guiding layer 4122 having a 1.3 μm composition (0.15 μm thick), a p-InP cladding layer 4106 (2 μm thick) and a p-InGaAsP cap layer 4121 having a 1.4 μm composition (0.3 μm thick) were grown on an n-InP substrate 4102 (350 μm thick) by means of a metal organic vapor phase growth technique for the ring resonator type semiconductor laser 4150. After the crystal growth process, photoresist AZ-1350 (tradename, available from Hoechst) was applied onto the p-InGaAsP cap layer by means of a spin coater to get a film thickness of 1 μm. After pre-baking the wafer at 80° C. for 30 minutes, it was exposed to light with a mask covering it. The optical waveguide showed a width of 5 μm, whereas it showed a maximum width of 8 μm and a minimum width of 5 μm in the tapered region 4000 after the development and rinse process. The circuital optical waveguide had a length of 600 μm. Subsequently, the wafer was introduced into a reactive ion etching system and etched to show a hollow section with a depth of 3 μm by means of chlorine gas. Finally, Cr/Au was made to deposit on the p-InGaAsP cap layer 4121 by vapor deposition in order to produce an anode there, while AuGe/Ni/Au was made to deposit on the n-InP substrate also by vapor deposition in order to produce a cathode 4104 there. Thereafter, the wafer was annealed in a hydrogen-containing atmosphere to give rise to an ohmic contact. In FIG. 31, reference numeral 4124 denotes an electric terminal for taking out a beat signal.

Light striking the ring resonator type semiconductor laser having the above described configuration is reflected by the surface thereof, or the interface of the laser and air, because of the difference of the refractive index of the semiconductor and that of air. If the refractive index of the semiconductor is 3.5, a total reflection occurs when the angle between the normal to the interface and the laser beam is equal to or greater than 16.6°. Since the mode of oscillation for receiving the total reflection shows an oscillation threshold value smaller than any other modes because of a reduced mirror loss, the laser device starts oscillating with a low injected current level. Additionally, since gain concentratively appears in this oscillation mode, oscillations in any other modes will be suppressed. In FIG. 30, the angle between the normal to the interface of the semiconductor and air is 45° at any corner of the semiconductor laser and hence satisfies the angular requirement for total reflection. The oscillation threshold value at room temperature was 3 mA for the laser beam 4003 and 3.5 mA for the laser beam 4002.

As for the profile of the tapered region, both of the angles α and β in FIG. 8 are preferably less than 90° in order for the mirror loss of the laser beam propagating in either direction not to be too large, although the above limitation may be eliminated when certain desired requirements are met.

Figure 32:
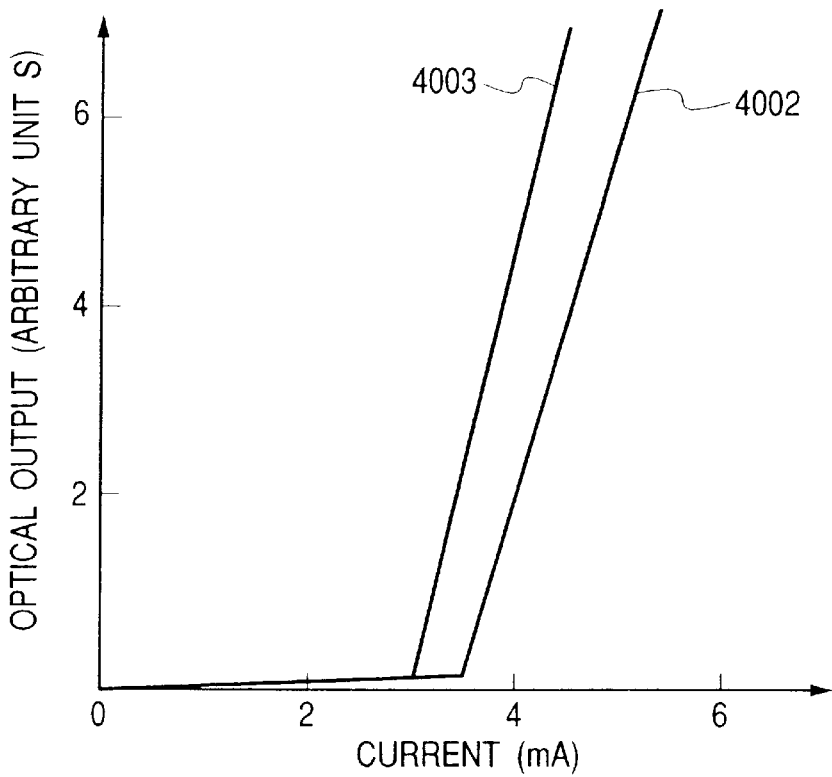
FIG. 32 is a graph showing the relationship between the electric current and the optical output of the ring resonator type semiconductor laser of this example.

FIG. 32 is a graph showing the relationship between the electric current and the optical output of the ring resonator type semiconductor laser of this example at room temperature. If the ring resonator type semiconductor laser 4150 does not have a tapered region, its drive current is 4.5 mA, and when the laser is held stationary, the laser beam 4003 and the laser beam 4002 show a common oscillation wavelength λ, which is equal to 1.55 μm. However, since the oscillation threshold value for the oscillation of the laser beam 4003 was lower than its counterpart for the oscillation of the laser beam 4002 in the semiconductor laser having the tapered region as shown in FIG. 30, the intensity of the laser beam 4003 is greater than that of the laser beam 4002 as seen from FIG. 32.

In other words, the photon number density as defined by equations (8) and (9) described earlier differs between the laser beam 4003 and the laser beam 4002.

Therefore, the oscillation frequency of the laser beam 4003 differs from that of the laser beam 4002. The oscillation frequency $f_3$ of the laser beam 4003 is greater than the oscillation frequency $f_4$ of the laser beam 4002 by 1 kHz. Then, the laser beam 4003 and the laser beam 4002 interfere with each other in the ring resonator type semiconductor laser. If a constant source current is used, a signal having an amplitude of 100 mV and a frequency of 1 kHz can be obtained by monitoring the voltage between the electrode terminal 4124 and the cathode 4104. In other words, a beat voltage can be detected even when the ring resonator type semiconductor laser is held stationary.

If the ring resonator type semiconductor laser is driven to rotate clockwise at a rate of 30° per second which roughly corresponds to the rate of vibration of a camera being shaken or that of a moving automobile, the oscillation frequency $f_3$ of the laser beam 4003 propagating counterclockwise is raised by 88.7 Hz, while, on the other hand, the oscillation frequency $f_4$ of the laser beam 4002 propagating clockwise is reduced by 88.7 Hz. Then, the beat frequency can be obtained by formula (12) below.

$$f_3-f_4=1\text{ kHz}+177.4\text{ Hz} \tag{12}$$

In the case where, on the other hand, the ring resonator type semiconductor laser is driven to rotate counterclockwise at a rate of 30° per second, the beat frequency can be obtained by formula (13) below.

$$f_3-f_4=1\text{ kHz}-177.4\text{ Hz} \tag{13}$$

Since the absolute value of the increase or the decrease of the beat frequency is proportional to the rotation speed, it is now possible to detect not only the rotation speed of the semiconductor laser but also the sense or rotation because the increase or the decrease in the beat frequency shows a one-to-one correspondence relative to the sense or rotation.

Figure 33:
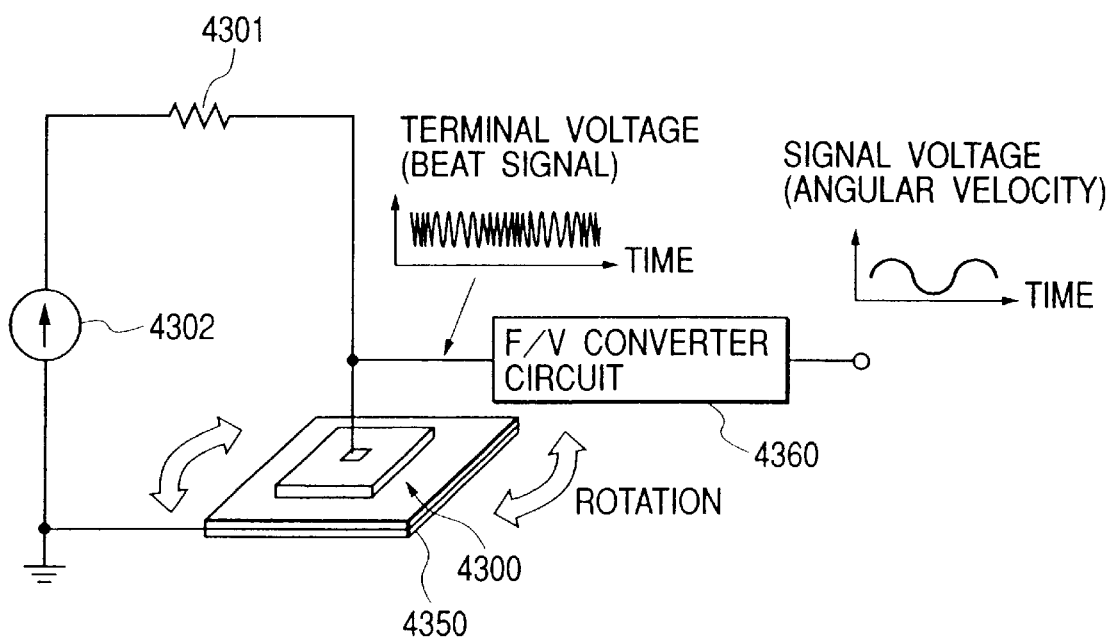
FIG. 33 is another schematic illustration of the example.
Figure 34:
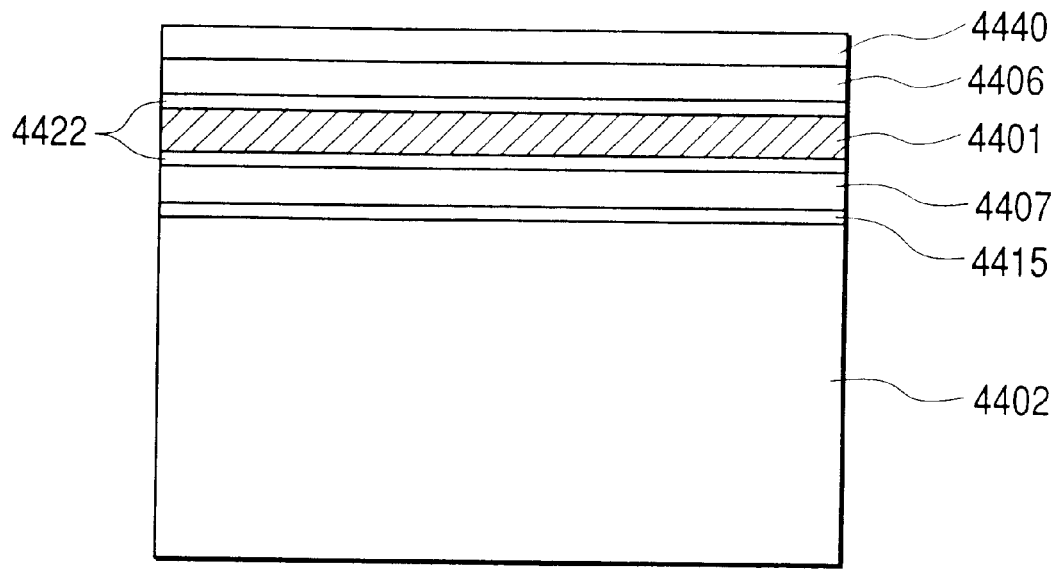
FIG. 34 is another schematic illustration of the example.

FIG. 33 is a schematic illustration of an arrangement for detecting a beat signal by means of the above laser device. Referring to FIG. 33, there are shown a gyro 4300, a rotation table 4350, a current source 4302, a resistor 4301 and a frequency/voltage converter circuit (F/V converter circuit) 4360.

With the above arrangement, an electric current is injected into the gyro 4300 from the current source 4302 by way of the resistor 4301 that is connected in series. If the gyro 4300 is held stationary, a beat signal representing the difference between the oscillation frequencies (oscillation wavelengths) of the two laser beams can be obtained as a change in the terminal voltage. If the gyro 4300 that is mounted on the rotation table 4350 is driven to rotate, the obtained beat signal represents the angular velocity of the rotation of the gyro.

The beat frequency can be converted into a voltage value by causing the beat signal to pass through the frequency/voltage converter circuit (F/V converter circuit) 4360.

If the voltage output of the frequency/voltage converter circuit (F/V converter circuit) 4360 is made equal to zero when the gyro 4300 is held stationary by regulating the offset, the sense of rotation of the gyro can be detected by seeing if the output of the frequency/voltage converter circuit (F/V converter circuit) 4360 is positive or negative.

FIG. 11 is a schematic circuit diagram of a frequency/voltage converter circuit (F/V converter circuit). The circuit comprises a transistor, diodes, capacitors and resistors and the output voltage $V_{c2}$ thereof is expressed by formula (10) below;

$$V_{c2}=E_iC_1R_0f[1+1/\{1-\exp(-1/R_0C_2f)\}] \tag{10}$$

where $E_i$ represents the peak-to-peak value of the input voltage and f represents the beat frequency. By selecting values that realize $C_2>C_1$ and $R_0C_2f<1$ for the circuit parameters, the relationship as expressed by equation (11) below can be established to obtain a voltage output that is proportional to the beat frequency.

$$V_{c2}=E_iC_1R_0f/2 \tag{11}$$

While the change in the terminal voltage is observed by driving the gyro with a constant current in this example, the change in the electric current flowing to the terminal can be observed if the gyro is driven with a constant voltage. Alternatively, the change in the discharge impedance can be directly detected by means of an impedance meter.

Then, the use of a photodetector for detecting the beat light can be omitted so that consequently the optical feedback noise caused by the light coming back from photodetector can be eliminated.

While the semiconductor laser was realized by using InGaAsP type materials in the above example, they may be replaced by GaAs type, ZnSe type, InGaN type or AlGaN type materials. Additionally, the profile of the optical waveguide may be hexangular, triangular or circular instead of being rectangular as shown in FIG. 30.

Now, another method of preparing a laser device will be described by referring to FIGS. 34 through 40.

An active layer 4401 having a multiple quantum well structure of three layers of $Al_{0.3}Ga_{0.7}As/GaAs$ is formed on an n-GaAs substrate 4402 with a pair of optical guiding layers 4422 of $Al_{0.3}Ga_{0.7}As$ sandwiching the active layer, which are then further sandwiched by a cladding layer 4406 (p-$Al_{0.5}Ga_{0.5}As$) and another cladding layer 4407 (n-$Al_{0.5}Ga_{0.5}As$). Reference numeral 4415 in FIG. 34 denotes a buffer layer made of n-GaAs and reference numeral 4440 denotes a cap layer made of p-GaAs.

Figure 35:
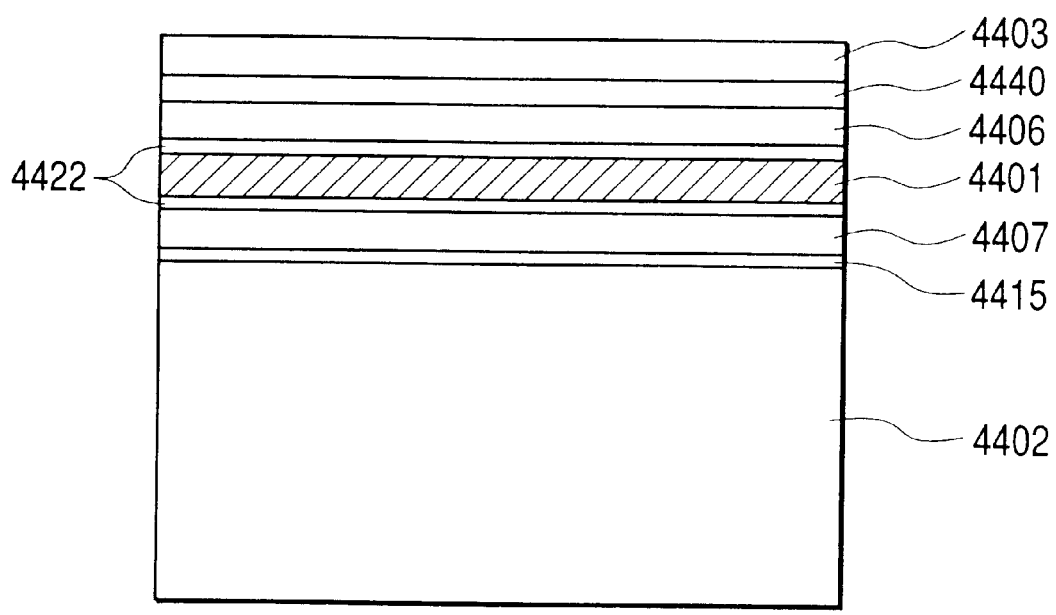
FIG. 35 is another schematic illustration of the example.

Then, Cr/Au (or Ti/Pt/Au) is formed on the cap layer 4440 for the anode 4403 (FIG. 35).

Figure 36:
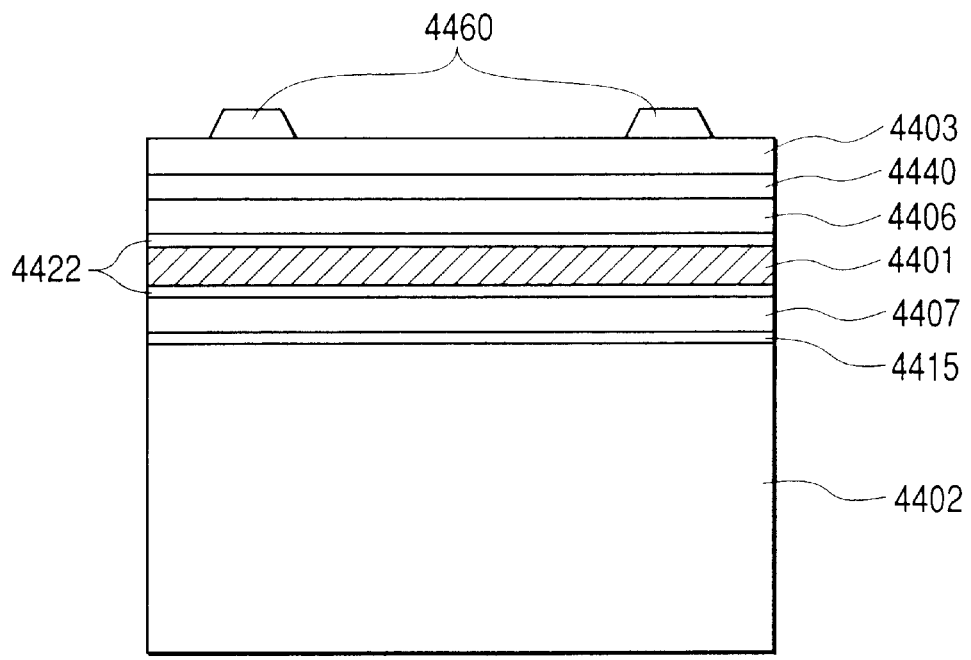
FIG. 36 is another schematic illustration of the example.

Thereafter, photoresist 4460 is applied thereto and subjected to a patterning operation as shown in FIG. 36.

Figure 37:
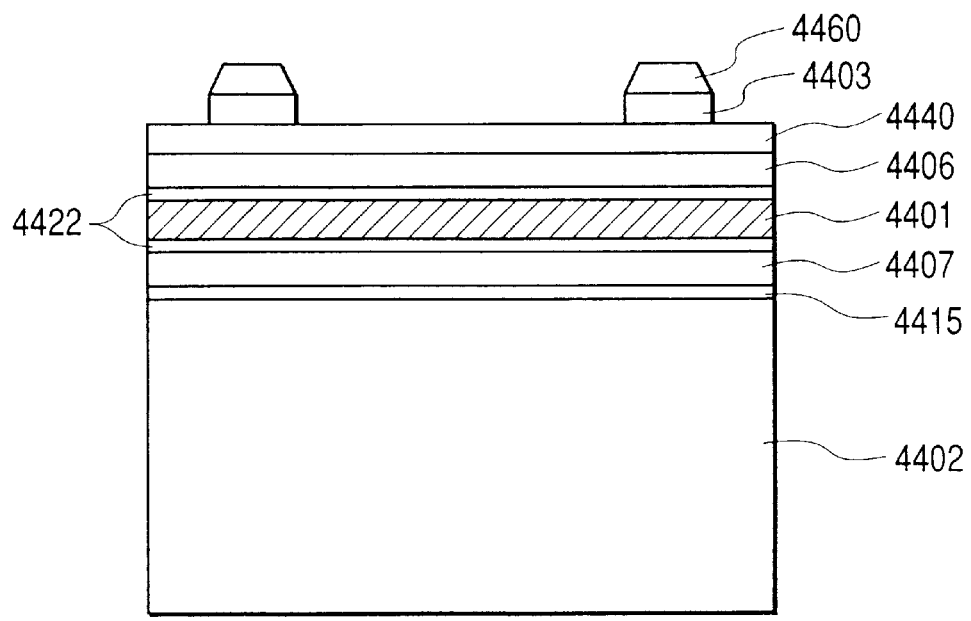
FIG. 37 is another schematic illustration of the example.
Figure 38:
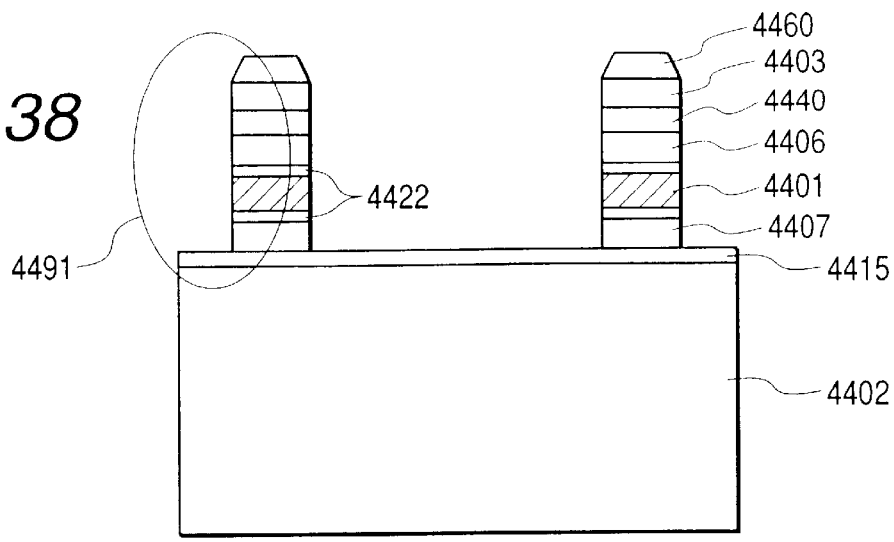
FIG. 38 is another schematic illustration of the example.

Then, the anode 4403 is subjected to a dry etching operation by using the patterned photoresist 4460 as mask (FIG. 37).

Figure 39:
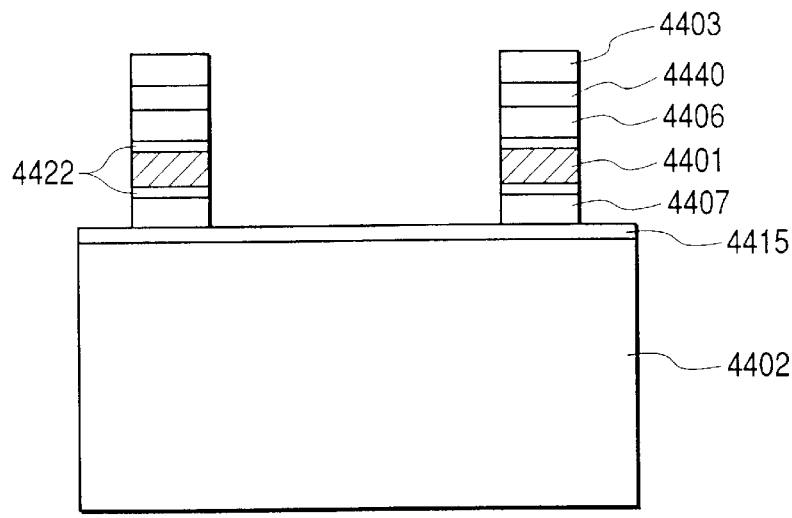
FIG. 39 is another schematic illustration of the example.

Subsequently, the semiconductor layer is removed by dry-etching (FIG. 38) and the photoresist is removed (FIG. 39).

Then, the anode is annealed in a hydrogen-containing atmosphere to turn it into an alloy.

Figure 40:
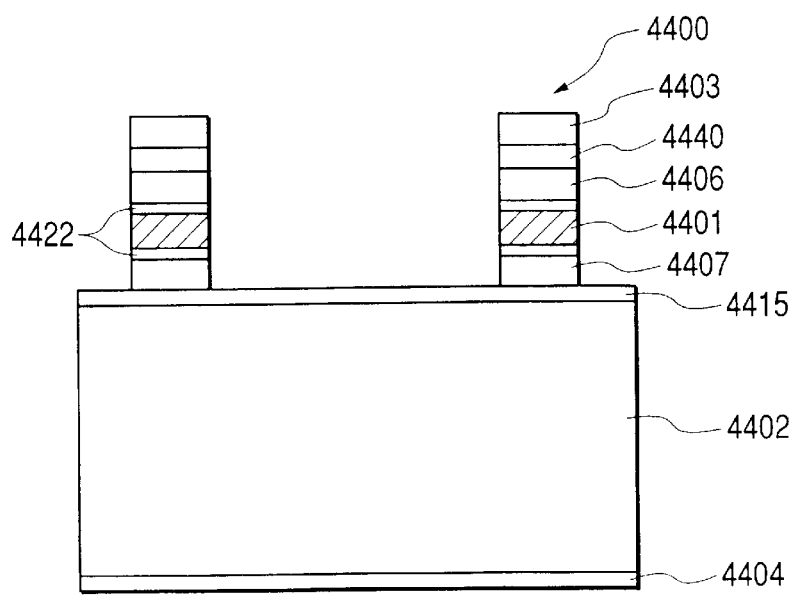
FIG. 40 is another schematic illustration of the example.

After polishing the substrate (if necessary), the cathode 4404 is formed by depositing AuGeNi/Au (FIG. 40).

Figure 41:
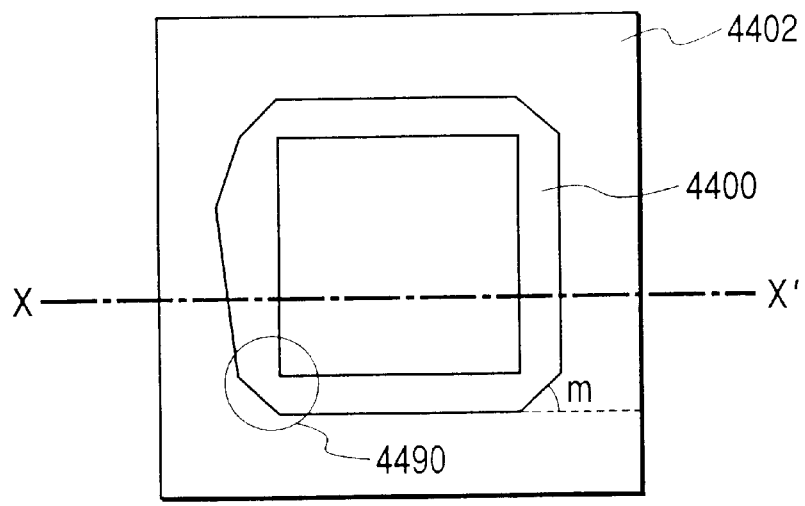
FIG. 41 is another schematic illustration of the example.

Thus, the ring resonator type semiconductor laser 4400 is formed. FIG. 41 is a schematic plan view of the prepared laser device.

It is advantageous that angle m in FIG. 41 is 45±0.01°, preferably 45±0.001°. This statement holds true for the other corners. This is the requirement that should be met in order for the laser beams to return to the respective originating points after making a full turn in the optical resonator.

It may be needless to say that the angular requirement of m should be met if the semiconductor ring laser is formed by some other method.

Figure 42:
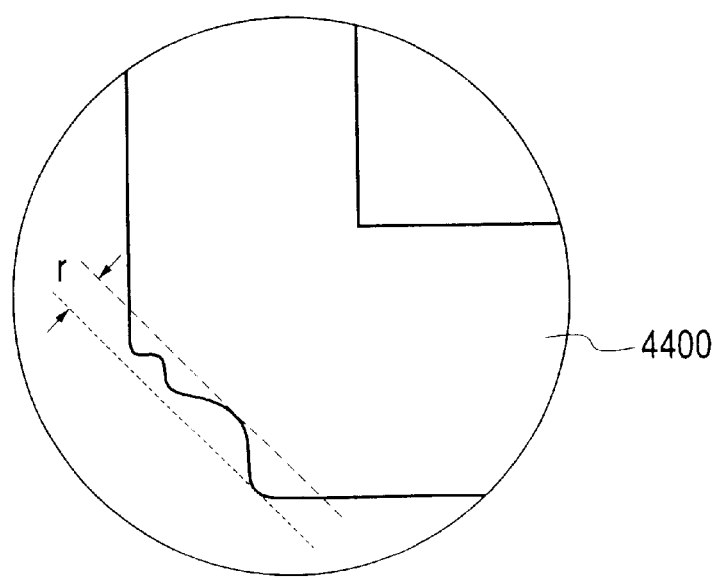
FIG. 42 is an enlarged schematic illustration of a corner of the example.

FIG. 42 is an enlarged schematic illustration of corner 4490 of the device of FIG. 41. The surface coarseness as expressed by r in FIG. 42 is less than 500 Å, preferably less than 200 Å. Then, the backward scattering can be minimized to prevent the locking-in phenomenon from taking place.

EXAMPLE 2

Figure 43:
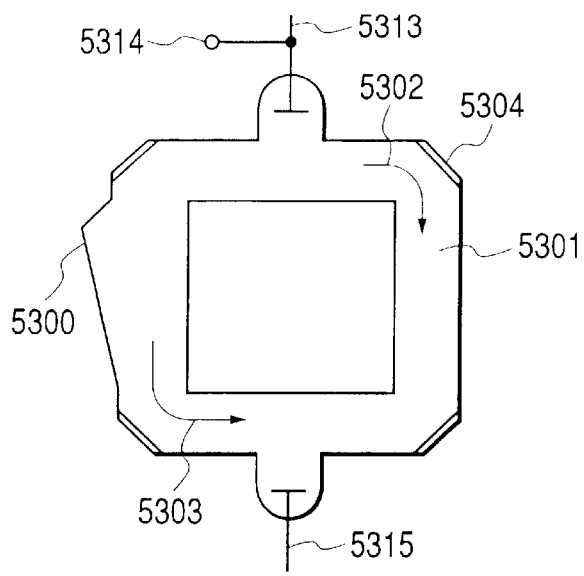
FIG. 43 is a schematic illustration of another example as described hereinafter for the purpose of the invention.

FIG. 43 is a schematic illustration of the second example of the invention. Referring to FIG. 43, the laser device of this example comprises a quartz tube 5301 including an asymmetrically tapered region 5300 of the optical waveguide thereof, a mirror 5304, an anode 5313, an electric terminal 5314 and a cathode 5315. Reference numeral 5303 denotes a laser beam propagating circuitally counterclockwise and a reference numeral 5302 denotes a laser beam propagating circuitally clockwise.

Of the above laser device, the quartz tube 5301 was formed by hollowing a quartz block by means of a drill. Thereafter, the mirror 5304 was fitted to the quartz tube 5301. Additionally, the anode 5313, the electric terminal 5314 and the cathode 5315 were also fitted to the quartz tube 5301. Subsequently, helium gas and neon gas were introduced into the quartz tube 5301 and a voltage was applied between the anode and the cathode to give rise to an electric discharge and cause an electric current to flow. As a result, the counterclockwise laser beam 5303 and the clockwise laser beam 5302 oscillated in the quartz tube 5301.

As for the profile of the tapered region, both of the angles α and β in FIG. 8 are preferably less than 90° in order for the mirror loss of the laser beam propagating in either direction not to be too large, although the above limitation may be eliminated when certain desired requirements are met.

If the quartz tube 5301 does not have an asymmetrically tapered region and is held stationary, the laser beam 5303 and the laser beam 5302 show an identical oscillation frequency of $4.73 \times 10^{14}$ Hz and an identical wavelength λ of 632.8 nm. However, since the optical waveguide is provided with an asymmetrically tapered section, the oscillation threshold value for the oscillation of the laser beam 5303 is lower than its counterpart for the oscillation of the laser beam 5302 in the semiconductor laser. As a result, the intensity of the laser beam 5303 is greater than that of the laser beam 5302. Therefore, the oscillation frequency $f_1$ of the laser beam 5303 is greater than the oscillation frequency $f_2$ of the laser beam 5302 by 20 MHz. Then, the laser beam 5303 and the laser beam 5302 interfere with each other in the quartz tube 5301. If a constant source current is used, a signal having an amplitude of 100 mV and a frequency of 20 MHz can be obtained by monitoring the voltage between the electrode terminal 5314 and the cathode 5315. In other words, a beat voltage can be detected even when the quartz tube is held stationary.

If the quartz tube 5301 is driven to rotate clockwise at a rate of 180° per second and each side of the quartz tube 5301 is 10 cm long, the oscillation frequency $f_1$ of the laser beam 5303 propagating counterclockwise is raised by 248.3 kHz, while, on the other hand, the oscillation frequency $f_2$ of the laser beam 5302 propagating clockwise is reduced by 248.3 kHz. Then, the beat frequency can be obtained by formula (14) below.

$$f_1 - f_2 = 20 \text{ MHz} + 496.6 \text{ kHz} \tag{14}$$

In the case where, on the other hand, the quartz tube 5301 is driven to rotate counterclockwise at a rate of 180° per second, the beat frequency can be obtained by formula (15) below.

$$f_1 - f_2 = 20 \text{ MHz} - 496.6 \text{ kHz} \tag{15}$$

Since the absolute value of the increase or the decrease of the beat frequency is proportional to the rotation speed, it is now possible to detect not only the rotation speed of the semiconductor laser but also the sense or rotation because the increase the decrease in the beat frequency shows a one-to-one correspondence relative to the sense rotation.

While the change in the terminal voltage is observed by driving the gyro with a constant current in this example, the change in the electric current flowing to the terminal can be observed if the gyro is driven with a constant voltage. Alternatively, the change in the discharge impedance can be directly detected by means of an impedance meter.

While helium gas and neon gas were introduced into the quartz tube in this example, they may be replaced by any gas that can give rise to a laser oscillation. Additionally, the profile of the optical waveguide may be hexangular, triangular or circular instead of being rectangular as shown in FIG. 43.

As pointed out above, while helium gas and neon gas were introduced into the quartz tube in this example, they may be replaced by any gas that can give rise to a laser oscillation and hence the angular velocity of the quartz tube can be detected. For example, an argon ion laser, a carbon dioxide gas laser or an excimer laser may alternatively be used for the purpose of the invention.

While the use of a quartz tube is described above for preparing a gas laser, the quartz tube may be relaced by a polymer tube. The use of a polymer tube provides an advantage of using a low temperature manufacturing process. Polymer materials that can be used for the purpose of the invention include fluorinated polyimide, polysiloxane, PMMA (polymethylmethacrylate), epoxy and polycarbonate.

Materials that can be used for the discharge electrode for the purpose of the invention include aluminum, zirconium and tungsten.

EXAMPLE 3

Figure 44:
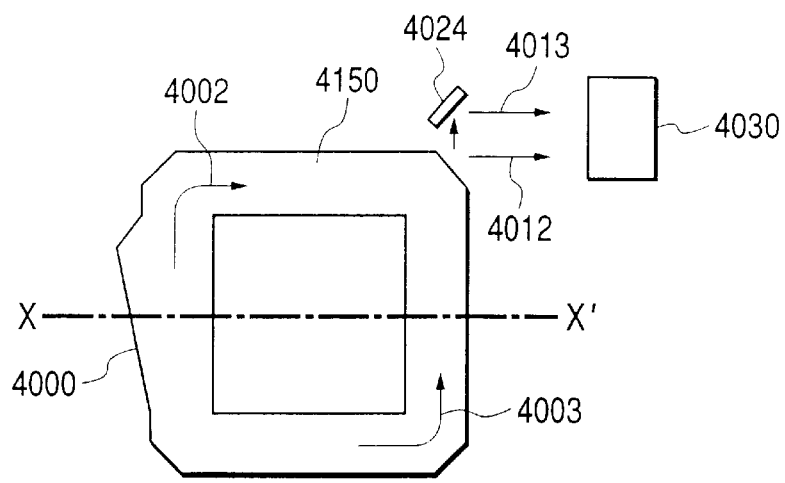
FIG. 44 is a schematic illustration of another example as described hereinafter for the purpose of the invention.
Figure 45:
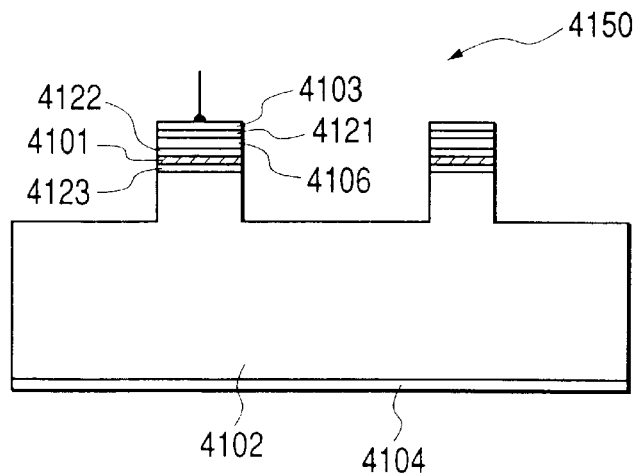
FIG. 45 is another schematic illustration of the example.

In this example, a semiconductor laser having an asymmetrically tapered region was prepared by means of a method same as the one described in Example 1 above. This will be described by referring to FIGS. 44 and 45.

If the ring resonator type semiconductor laser 4150 does not have a tapered region, its drive current is 4.5 mA, and when the laser is held stationary, the laser beam 4003 and the laser beam 4002 show the same oscillation wavelength λ, which was equal to 1.55 μm. However, since the oscillation threshold value for the oscillation of the laser beam 4003 is lower than its counterpart for the oscillation of the laser beam 4002 in the semiconductor laser having the tapered region as shown in FIG. 32, the intensity of the laser beam 4003 is greater than that of the laser beam 4002 as seen from FIG. 32. Therefore, the oscillation frequency of the laser beam 4003 differs from that of the laser beam 4002. The oscillation frequency $f_3$ of the laser beam 4003 is greater than the oscillation frequency $f_4$ of the laser beam 4002 by 1 kHz. Then, the laser beam 4003 and the laser beam 4002 interfere with each other in the photodetector 4030 when the laser beam 4013 and the laser beam 4012 are received by the photodetector 4030 simultaneously. As a result, a signal having an amplitude of 50 mV and a frequency of 1 kHz can be obtained from the electric terminal of the photodetector 4030. In other words, a beat voltage can be detected even when the ring resonator type semiconductor laser 4050 is held stationary. In order for the laser beam 4013 and the laser beam 4012 to propagate in the same direction when getting to the photodetector 4030, a mirror 4024 was used to reflect the laser beam 4013. The mirror was prepared by depositing aluminum on a quartz plate by vapor deposition and the photodetector was available from NEC.

If the ring resonator type semiconductor laser is driven to rotate clockwise at a rate of 30° per second which roughly corresponds to the rate of vibration of a camera being shaken or that of a moving automobile, the oscillation frequency $f_3$ of the laser beam 4003 propagating counterclockwise is raised by 88.7 Hz, while, on the other hand, the oscillation frequency $f_4$ of the laser beam 4002 propagating clockwise is reduced by 88.7 Hz. Then, the beat frequency can be obtained by formula (12) below.

$$f_3-f_4=1 \text{ kHz}+177.4 \text{ Hz} \tag{12}$$

In the case where, on the other hand, the ring resonator type semiconductor laser is driven to rotate counterclockwise at a rate of 300 per second, the beat frequency can be obtained by formula (13) below.

$$f_3-f_4=1 \text{ kHz}-177.4 \text{ Hz} \tag{13}$$

Since the absolute value of the increase or the decrease of the beat frequency is proportional to the rotation speed, it is now possible to detect not only the rotation speed of the semiconductor laser but also the sense rotation because the increase the decrease in the beat frequency shows a one-to-one correspondence relative to the sense rotation.

EXAMPLE 4

Figure 46:
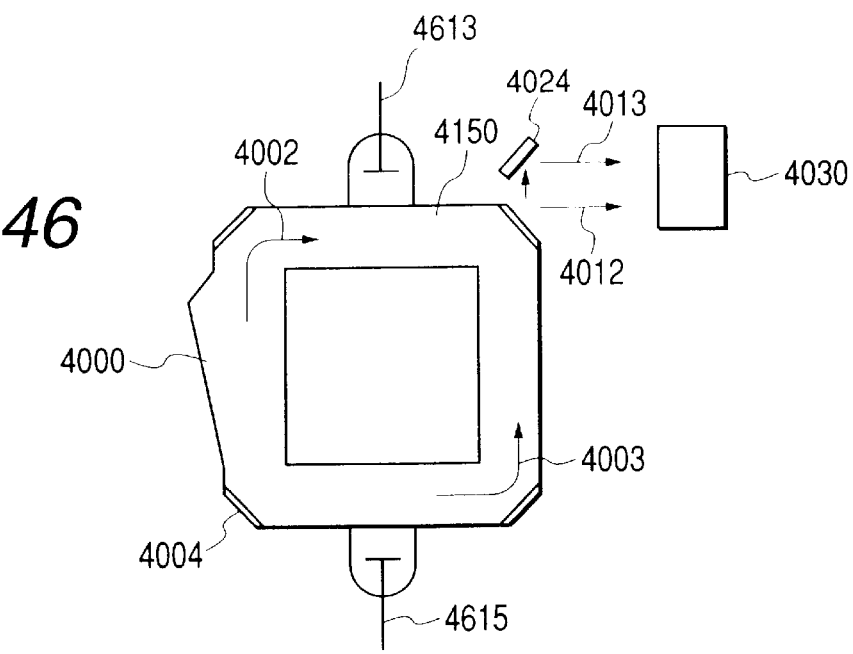
FIG. 46 is a schematic illustration of another example as described hereinafter for the purpose of the invention.

FIG. 46 is a schematic illustration of the fourth example of the invention. Referring to FIG. 46, the laser device of this example comprises a photodetector 4030, a quartz tube 4150 including an asymmetrically tapered region 4000 of the optical waveguide thereof, a mirror 4004, an anode 4613, another mirror 4024 and a cathode 4615. Reference numeral 4003 denotes a laser beam propagating circuitally counterclockwise and reference numeral 4002 denotes a laser beam propagating circuitally clockwise.

The device was prepared by the method described above by referring to Example 2.

If the quartz tube 4150 does not have a tapered region and is held stationary, the laser beam 4003 and the laser beam 4002 show an identical oscillation frequency of $4.73 \times 10^{14}$ Hz and an identical wavelength λ of 632.8 nm. However, since the optical waveguide is provided with an asymmetrically tapered region 4000, the oscillation threshold value for the oscillation of the laser beam 4003 is lower than its counterpart for the oscillation of the laser beam 4002 in the semiconductor laser. As a result, the intensity of the laser beam 4003 is greater than that of the laser beam 4002. Therefore, the oscillation frequency $f_1$ of the laser beam 4003 is greater than the oscillation frequency $f_2$ of the laser beam 4002 by 20 MHz.

The laser beams 4013 and 4012 are partly taken out from the mirror of the operation resonator and made to enter the photodetector 4030 simultaneously. In order for the laser beam 4013 and the laser beam 4012 to propagate in the same direction when getting to the photodetector 4030, a mirror 4024 was used to reflect the laser beam 4013. Then, the laser beam 4003 and the laser beam 4002 interfere with each other in the quartz tube 5301. As a result, a signal having an amplitude of 100 mV and a frequency of 20 MHz can be obtained from the photodetector 4030. In other words, a beat voltage can be detected even when the quartz tube is held stationary.

If the quartz tube 4150 is driven to rotate clockwise at a rate of 180° per second and each side of the resonator is 10 cm long, the oscillation frequency $f_1$ of the laser beam 4003 propagating counterclockwise is raised by 248.3 kHz, while, on the other hand, the oscillation frequency $f_2$ of the laser beam 4002 propagating clockwise is reduced by 248.3 kHz. Then, the beat frequency can be obtained by formula (14) below.

$$f_1-f_2=20 \text{ MHz}+496.6 \text{ kHz} \tag{14}$$

In the case where, on the other hand, the quartz tube 4150 is driven to rotate counterclockwise at a rate of 180° per second, the beat frequency can be obtained by formula (15) below.

$$f_1-f_2=20 \text{ MHz}-496.6 \text{ kHz} \tag{15}$$

Since the absolute value of the increase or the decrease of the beat frequency is proportional to the rotation speed, it is now possible to detect not only the rotation speed of the semiconductor laser but also the sense rotation because the increase the decrease in the beat frequency shows a one-to-one correspondence relative to the sense rotation.

EXAMPLE 5

Figure 47:
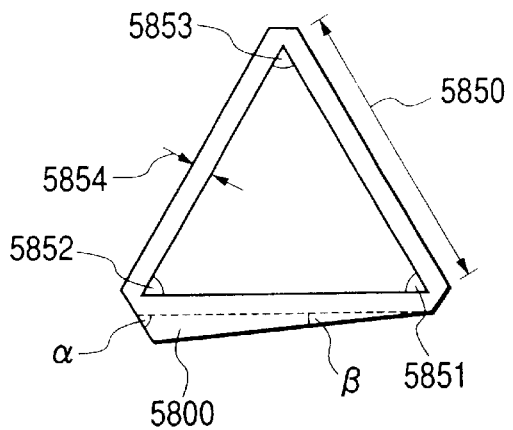
FIG. 47 is a schematic illustration of another example as described hereinafter for the purpose of the invention.

A ring resonator type semiconductor laser having a configuration as shown in FIG. 47 was prepared in this example by means of the method described above by referring to Example 1.

The tapered region 5800 in FIG. 47 will be described below in detail.

Referring to FIG. 47, the angles of the tapered region 5800 were α=60° and β=3°. All the internal angles (5851 through 5853) of the triangular ring were the same and equal to 60°. The triangular ring had three sides 5850 that were same in length and equal to 320 μm. The portion of the optical waveguide having a constant width 5854 was 5 μm. In FIG. 47, the dotted line is an imaginary line used for clearly showing the tapered region.

The laser oscillation threshold value of the device was about 5 mA.

The laser device was driven to operate with an electric current of 30 mA. The voltage signal obtained when the laser device was held stationary showed a frequency of 182 kHz.

Then, the laser device was subjected to a clockwise rotation and then to a counterclockwise rotation at a rate of 180° per second.

When the device was driven to rotate clockwise, the frequency of the voltage signal was raised to 209 kHz. When, on the other hand, the device was driven to rotate counterclockwise, the frequency of the voltage signal was reduced to 161 kHz.

Thus, it was possible to detect the rotation of the device as a result of the provision of a tapered region.

Figure 48:
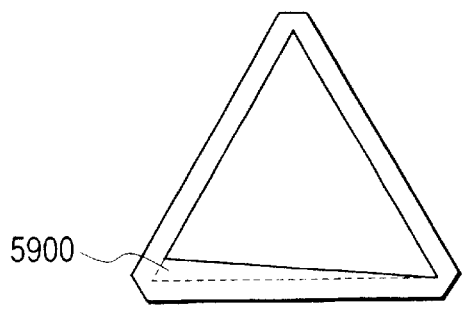
FIG. 48 is a schematic illustration of another possible example as described hereinafter for the purpose of the invention.

The profile of the tapered region of the laser device is by no means limited to that of FIG. 47. A tapered region 5900 as shown in FIG. 48 may alternatively be used. Additionally, the profile of the optical waveguide may be that of an isosceles triangle, a rectangle or a circle instead of that of a regular triangle as shown in FIG. 47.

As described above in detail, according to the invention, it is now possible to detect not only the angular velocity but also the sense of rotation of a rotating object.

What is claimed is:

1. A gyro comprising:
   a laser device for generating laser beams in a waveguide to be propagated circuitally in opposite directions, the laser beams having oscillation frequencies,
   wherein said laser device is a ring resonator type laser device and has an asymmetrically tapered region which includes (i) a first tapered section where the waveguide is gradually broadened along the direction of propagation of the laser beams and (ii) a second tapered section where the waveguide is gradually narrowed along the direction of propagation of the laser beams, and
   wherein an electric signal is detected from said laser device and the oscillation frequencies of the laser beams are different from each other when said laser device is stationary.

2. A gyro according to claim 1, wherein the laser beams have respective oscillation threshold values that are different from each other.

3. A gyro according to claim 1, wherein the laser beams have respective intensities that are different from each other.

4. A gyro according to claim 1, wherein the laser beams have respective oscillation frequencies that are different from each other by not less than 100 Hz.

5. A gyro according to claim 1, wherein the laser beams have respective oscillation frequencies that are different from each other by not less than 1 kHz.

6. A gyro according to claim 1, wherein the laser beams have respective oscillation frequencies that are different from each other by not less than 10 kHz.

7. A gyro according to claim 1, wherein the waveguide of the laser device has a ring-shaped profile and includes an asymmetrically tapered region arranged outside the ring-shaped profile.

8. A gyro according to claim 1, wherein the waveguide of the laser device has a ring-shaped profile and includes an asymmetrically tapered region arranged inside the ring-shaped profile.

9. A gyro according to claim 1, wherein both the first tapered section and the second tapered section form an acute angle with a region of the waveguide having a constant width.

10. A gyro according to claim 1, wherein said laser device is a semiconductor laser.

11. A gyro according to claim 1, wherein said laser device has a quantum well structure.

12. A gyro according to claim 1, wherein said laser device is a gas laser.

13. A gyro according to claim 1, wherein said laser device is driven with a constant current.

14. A gyro according to claim 1, wherein said laser device is driven with a constant voltage.

15. A gyro according to claim 1, wherein a beat signal is detected as a function of the change of the electric signal.

16. A gyro according to claim 1, wherein an angular velocity and a sense of rotation are detected by detecting a change in the frequency of the electric signal.

17. A gyro according to claim 1, wherein said laser device is provided with an electric terminal for detecting the electric signal.

18. A gyro according to claim 1, wherein the electric signal is obtained by a photodetector arranged outside said laser device.

19. A gyro according to claim 1, wherein the electric signal is detected to detect an angular velocity and a sense of rotation.

20. A gyro according to claim 1, wherein said gyro is an optical gyro.

21. A gyro according to claim 1, further comprising a frequency/voltage converter circuit.

22. A gyro comprising:
    a laser device,
    wherein said laser device is a ring resonator type laser device and has a waveguide including an asymmetrical tapered region arranged at least in part thereof, the asymmetrical tapered region including (i) a first tapered section where the waveguide is gradually broadened along the direction of propagation of the laser beams and (ii) a second tapered section where the waveguide is gradually narrowed along the direction of propagation of the laser beams, and
    wherein an electric signal is detected from said laser device.

23. A gyro according to claim 22, wherein the tapered region is asymmetric relative to a plane perpendicular to the direction of propagation of the laser beams.

24. A gyro according to claim 22, wherein the waveguide of said laser device has a ring-shaped profile.

25. A gyro according to claim 22, wherein the waveguide of said laser device has a ring-shaped profile and the asymmetrically tapered region is arranged outside the ring-shaped profile.

26. A gyro according to claim 22, wherein the waveguide of said laser device has a ring-shaped profile and the asymmetrically tapered region is arranged inside the ring-shaped profile.

27. A gyro according to claim 22, wherein both the first tapered section and the second tapered section form an acute angle with a region of the waveguide having a constant width.

28. A gyro comprising:
a laser device for generating laser beams in a waveguide to be propagated circuitally in opposite directions, the laser beams having oscillation frequencies; and
an electric signal detection means for detecting an electric signal from said laser device,
wherein said laser device is a ring resonator type laser device and has an asymmetrically tapered region which includes (i) a first tapered section where the waveguide is gradually broadened a long the direction of propagation of the laser beams and (ii) a second tapered section where the waveguide is gradually narrowed along the direction of propagation of the laser beams, and the oscillation frequencies of the laser beams are different from each other when said laser device is stationary.

29. A gyro according to claim 28, wherein the electric signal detection means includes an electric terminal.

30. A gyro according to claim 28, wherein the electric signal detection means is a voltage signal detection means.

31. A gyro according to claim 28, wherein the electric signal detection means includes a frequency/voltage converter circuit.

32. A gyro according to claim 28, wherein the electric signal detection means includes a subtraction circuit.

33. A gyro according to claim 28, wherein electric signal detection means includes a photodetector arranged outside said laser device.

34. A gyro comprising:
a laser device; and
a beat signal detection means,
wherein said laser device is a ring resonator type laser device and has a waveguide having an asymmetrically tapered region which includes (i) a first tapered section where the waveguide is gradually broadened along the direction of propagation of the laser beams and (ii) a second tapered section where the waveguide is gradually narrowed along the direction of propagation of the laser beams.

35. A gyro according to claim 34, wherein the waveguide of said laser device has a ring-shaped profile and the asymmetrically tapered region is arranged outside the ring-shaped profile.

36. A gyro according to claim 34, wherein the waveguide of said laser device has a ring-shaped profile and the asymmetrically tapered region is arranged inside the ring-shaped profile.

37. A gyro according to claim 34, wherein both the first tapered section and the second tapered section form an acute angle with a region of the waveguide having a constant width.

38. A gyro according to claim 34, wherein said beat signal detection means is a means for detecting said voltage signal.

39. A gyro according to claim 34, wherein said beat signal detection means detects a voltage signal applied to said laser device, a current signal flowing through said laser device or an impedance signal of said laser device.

40. A gyro according to claim 34, wherein said beat signal detection means includes an electric terminal detecting the beat signal.

41. A gyro according to claim 34, wherein said beat signal detection means includes a photodetector arranged outside said laser device.

42. A gyro according to claim 34, wherein said beat signal detection means includes a frequency/voltage converter circuit.

43. A gyro according to claim 34, wherein said beat signal detection means includes a subtraction circuit.

44. A gyro according to claim 34, wherein said beat signal detection means includes a protection circuit.

45. A gyro comprising:
a laser device for generating first and second laser beams having oscillation frequencies in a waveguide; and
an optical detector for detecting the interfered light generated by interference of the first and second laser beams,
wherein said laser device is a ring resonator type laser device and has an asymmetrically tapered region which includes (i) a first tapered section where the waveguide is gradually broadened along the direction of propagation of the laser beams and (ii) a second tapered section where the waveguide is gradually narrowed along the direction of propagation of the laser beams, and the oscillation frequencies of the first and second laser beams being different from each other when said laser device is stationary.

46. A gyro according to claim 45, wherein the waveguide of the laser device has a ring-shaped profile and includes an asymmetrically tapered region arranged outside the ring-shaped profile.

47. A gyro according to claim 45, wherein the waveguide of the laser device has a ring-shaped profile and includes an asymmetrically tapered region is arranged inside the ring-shaped profile.

48. A gyro according to claim 45, wherein both the first tapered section and the second tapered section form an acute angle with a region of the waveguide having a constant width.

49. A laser device comprising:
an optical waveguide having a ring-shaped profile and including an asymmetrically tapered region projecting to the outside;
the tapered region including a first tapered region gradually broadening the optical waveguide along the direction of laser beam propagation and a second tapered region gradually narrowing the optical waveguide along the direction of laser beam propagation; and
the angles defined respectively by the first and second tapered regions and the region of the optical waveguides showing a constant width are acute.

50. A laser device according to claim 49, wherein said laser device operates as a ring resonator.

51. A gyro comprising:
a laser device for generating laser beams to be propagated circuitally in opposite directions in an optical waveguide and for detecting an electric signal,
wherein the optical waveguide has a tapered region that is asymmetric relative to a plane perpendicular to the direction of propagation of the laser beams so that the oscillation frequencies of the laser beams are different from each other when the laser device is held stationary.

52. A camera including a gyro according to claim 51.

53. A lens including a gyro according to claim 51.

54. An automobile including a gyro according to claim 51.

55. An aircraft including a gyro according to claim 51.

56. A gyro according to claim 51, wherein a difference in the oscillation frequencies of said laser beams is increased with respect to one rotation direction of the laser device and is decreased with respect to the other rotation direction of the laser device.

* * * * *

UNITED STATES PATENT AND TRADEMARK OFFICE
CERTIFICATE OF CORRECTION

PATENT NO. : 6,741,354 B2 Page 1 of 1
DATED : May 25, 2004
INVENTOR(S) : Numai

It is certified that error appears in the above-identified patent and that said Letters Patent is hereby corrected as shown below:

Column 6,
Line 56, "to," should read -- to --.

Column 7,
Line 47, "device" should read -- device responds --.

Column 11,
Line 47, "subtraction-circuit" should read -- subtraction circuit --.

Column 17,
Line 26, "by turn" should read -- in turn --.

Column 23,
Line 66, "increase" should read -- increase or --.

Column 24,
Line 60, "increase" should read -- increase or --.

Column 27,
Line 10, "a long" should read -- along --; and
Line 26, "electric" should read -- the electric --.

Signed and Sealed this

Twenty-first Day of February, 2006

JON W. DUDAS
*Director of the United States Patent and Trademark Office*